United States Patent
Manolakos et al.

(10) Patent No.: US 12,196,868 B2
(45) Date of Patent: Jan. 14, 2025

(54) CONFIGURABLE COORDINATE SYSTEM FOR ANGLE REPORTING FOR POSITIONING

(71) Applicant: QUALCOMM Incorporated, San Diego, CA (US)

(72) Inventors: Alexandros Manolakos, Escondido, CA (US); Sony Akkarakaran, Poway, CA (US); Guttorm Ringstad Opshaug, Redwood City, CA (US); Sven Fischer, Nuremberg (DE); Joseph Binamira Soriaga, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 919 days.

(21) Appl. No.: 16/990,197

(22) Filed: Aug. 11, 2020

(65) Prior Publication Data
US 2021/0048500 A1 Feb. 18, 2021

(30) Foreign Application Priority Data
Aug. 12, 2019 (GR) .............. 20190100349

(51) Int. Cl.
*G01S 3/04* (2006.01)
*G01S 3/10* (2006.01)
(Continued)

(52) U.S. Cl.
CPC ............. *G01S 3/043* (2013.01); *G01S 3/10* (2013.01); *G01S 13/765* (2013.01); *H04W 24/10* (2013.01); *H04W 84/042* (2013.01)

(58) Field of Classification Search
CPC ........... G01S 3/043; G01S 3/10; G01S 13/765
(Continued)

(56) References Cited

U.S. PATENT DOCUMENTS 10,021,667 B2 7/2018 Akkarakaran et al.
10,306,405 B2 5/2019 Persson et al.
(Continued)

FOREIGN PATENT DOCUMENTS

JP 2011174759 A 9/2011
JP 2018136180 A 8/2018
(Continued)

OTHER PUBLICATIONS

Alcatel-Lucent., et al., "Coordinate Systems for 3D MIMO", 3GPP Draft, 3GPP TSG RAN WG1 Meeting #74bis, R1-134223 Coordinate Systems for 3D MIMO Final, 3RD Generation Partnership Project (3GPP), Mobile Competence Centre, 650, Route Des Lucioles, F-06921, Sophia-Antipolis Cedex, France, vol. RAN WG1, No. Guangzhou, China; Oct. 07, 2013-Oct. 11, 2013, Sep. 28, 2013 (Sep. 28, 2013), XP050717407, 6 pages, Retrieved from the Internet: URL: http://www.3gpp.org/ftp/tsg_ran/WG1_RL1/TSGR1_74b/Docs/ [retrieved on Sep. 28, 2013] the whole document.
(Continued)

*Primary Examiner* — Bo Fan
(74) *Attorney, Agent, or Firm* — QUALCOMM Incorporated

(57) ABSTRACT

Disclosed are techniques for wireless communication. In an aspect, a base station performs one or more angle-based measurements in a first coordinate system, determines whether to report, to a positioning entity, the one or more angle-based measurements in a local coordinate system (LCS) or a global coordinate system (GCS), and reports the one or more angle-based measurements to the positioning entity in the LCS or the GCS based on the determination. In an aspect, a positioning entity receives, from a base station, one or more angle-based measurements in an LCS of the base station or a GCS, determines whether the one or more angle-based measurements are in the LCS or the GCS, and
(Continued)

processes the one or more angle-based measurements based on the determination.

20 Claims, 14 Drawing Sheets

(51) Int. Cl.
   *G01S 13/76* (2006.01)
   *H04W 24/10* (2009.01)
   *H04W 84/04* (2009.01)

(58) Field of Classification Search
   USPC .......................................... 342/357.64, 125
   See application file for complete search history.

(56) References Cited

U.S. PATENT DOCUMENTS

| | | | |
|---|---|---|---|
| 10,324,162 | B2 | 6/2019 | Morioka |
| 10,756,831 | B2* | 8/2020 | Katabi ................. H04B 17/29 |
| 2012/0021758 | A1 | 1/2012 | Gum et al. |
| 2014/0266908 | A1 | 9/2014 | Pandey |
| 2015/0173038 | A1 | 6/2015 | Quan et al. |
| 2017/0234979 | A1* | 8/2017 | Mathews ................ G01S 1/024 |
| | | | 342/357.64 |
| 2018/0017661 | A1 | 1/2018 | Morioka |
| 2019/0166453 | A1 | 5/2019 | Edge et al. |
| 2019/0238202 | A1 | 8/2019 | Chavva et al. |
| 2020/0072939 | A1 | 3/2020 | Yamada et al. |

FOREIGN PATENT DOCUMENTS

| | | |
|---|---|---|
| WO | 2017164925 A1 | 9/2017 |
| WO | 2017223301 | 12/2017 |
| WO | 2018164173 A1 | 9/2018 |
| WO | 2019083596 A1 | 5/2019 |

OTHER PUBLICATIONS

International Search Report and Written Opinion—PCT/US2020/045946—ISA/EPO—Nov. 12, 2020.
3GPP TR 38.901: "3rd Generation Partnership Project, Technical Specification Group Radio Access Network, Study on Channel Model for Frequencies from 0.5 to 100 GHz (Release 15)", 3GPP TR 38.901, V15.0.0, Jun. 29, 2018, pp. 1-91, chapter, 6.3, 7.1.3, 7.5, 7.6.3.1.
Qualcomm Incorporated: "Summary #2 of 7.2.10.4: PHY Procedures for Positioning Measurements", 3GPP TSG-RAN WG1 Meeting #97, R1-1907841, 3rd Generation Partnership Project, Mobile Competence Centre, 650, Route Des Lucioles, France, vol. RAN WG1, No. Reno, Nevada, USA, May 13, 2019-May 17, 2019, May 17, 2019, XP051740114, pp. 1-17, 0, 1b, 1c, 1d, 2, 2a, 3a, 3d.
Taiwan Search Report—TW109127399—TIPO—Apr. 26, 2024.

* cited by examiner

CONFIGURABLE COORDINATE SYSTEM FOR ANGLE REPORTING FOR POSITIONING

CROSS-REFERENCE TO RELATED APPLICATION

The present Application for Patent claims priority under 35 U.S.C. § 119 to Greek Patent Application No. 20190100349, entitled "CONFIGURABLE COORDINATE SYSTEM FOR ANGLE REPORTING FOR POSITIONING," filed Aug. 12, 2019, assigned to the assignee hereof, and expressly incorporated herein by reference in its entirety.

BACKGROUND OF THE DISCLOSURE

1. Field of the Disclosure

Aspects of the disclosure relate generally to wireless communications and the like.

2. Description of the Related Art

Wireless communication systems have developed through various generations, including a first-generation analog wireless phone service (1G), a second-generation (2G) digital wireless phone service (including interim 2.5G networks), a third-generation (3G) high speed data, Internet-capable wireless service, and a fourth-generation (4G) service (e.g., Long-Term Evolution (LTE), WiMax). There are presently many different types of wireless communication systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

A fifth generation (5G) mobile standard calls for higher data transfer speeds, greater numbers of connections, and better coverage, among other improvements. The 5G standard (also referred to as "New Radio" or "NR"), according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G/LTE standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a base station includes performing one or more angle-based measurements in a first coordinate system, determining whether to report, to a positioning entity, the one or more angle-based measurements in a local coordinate system (LCS) or a global coordinate system (GCS), and reporting the one or more angle-based measurements to the positioning entity in the LCS or the GCS based on the determination.

In an aspect, a method of wireless communication performed by a positioning entity includes receiving, from a base station, one or more angle-based measurements in an LCS of the base station or a GCS, determining whether the one or more angle-based measurements are in the LCS or the GCS, and processing the one or more angle-based measurements based on the determination.

In an aspect, a base station includes a memory, at least one transceiver, and at least one processor communicatively coupled to the memory and the at least one transceiver, the at least one processor configured to perform one or more angle-based measurements in a first coordinate system, determine whether to report, to a positioning entity, the one or more angle-based measurements in an LCS or a GCS, and cause the at least one transceiver to report the one or more angle-based measurements to the positioning entity in the LCS or the GCS based on the determination.

In an aspect, a positioning entity includes a memory, a communication device, and at least one processor communicatively coupled to the memory and the communication device, the at least one processor configured to receive, from a base station via the communication device, one or more angle-based measurements in a LCS of the base station or a GCS, determine whether the one or more angle-based measurements are in the LCS or the GCS, and process the one or more angle-based measurements based on the determination.

In an aspect, a base station includes means for performing one or more angle-based measurements in a first coordinate system, means for determining whether to report, to a positioning entity, the one or more angle-based measurements in an LCS or a GCS, and means for reporting the one or more angle-based measurements to the positioning entity in the LCS or the GCS based on the determination.

In an aspect, a positioning entity includes means for receiving, from a base station, one or more angle-based measurements in an LCS of the base station or a GCS, means for determining whether the one or more angle-based measurements are in the LCS or the GCS, and means for processing the one or more angle-based measurements based on the determination.

In an aspect, a non-transitory computer-readable medium storing computer-executable instructions for wireless communication includes computer-executable instructions comprising at least one instruction instructing a base station to perform one or more angle-based measurements in a first coordinate system, at least one instruction instructing the base station to determine whether to report, to a positioning entity, the one or more angle-based measurements in an LCS or a GCS, and at least one instruction instructing the base station to report the one or more angle-based measurements to the positioning entity in the LCS or the GCS based on the determination.

In an aspect, a non-transitory computer-readable medium storing computer-executable instructions for wireless communication includes computer-executable instructions comprising at least one instruction instructing a positioning entity to receive, from a base station, one or more angle-based measurements in a LCS of the base station or a GCS, at least one instruction instructing the positioning entity to determine whether the one or more angle-based measurements are in the LCS or the GCS, and at least one instruction instructing the positioning entity to process the one or more angle-based measurements based on the determination.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
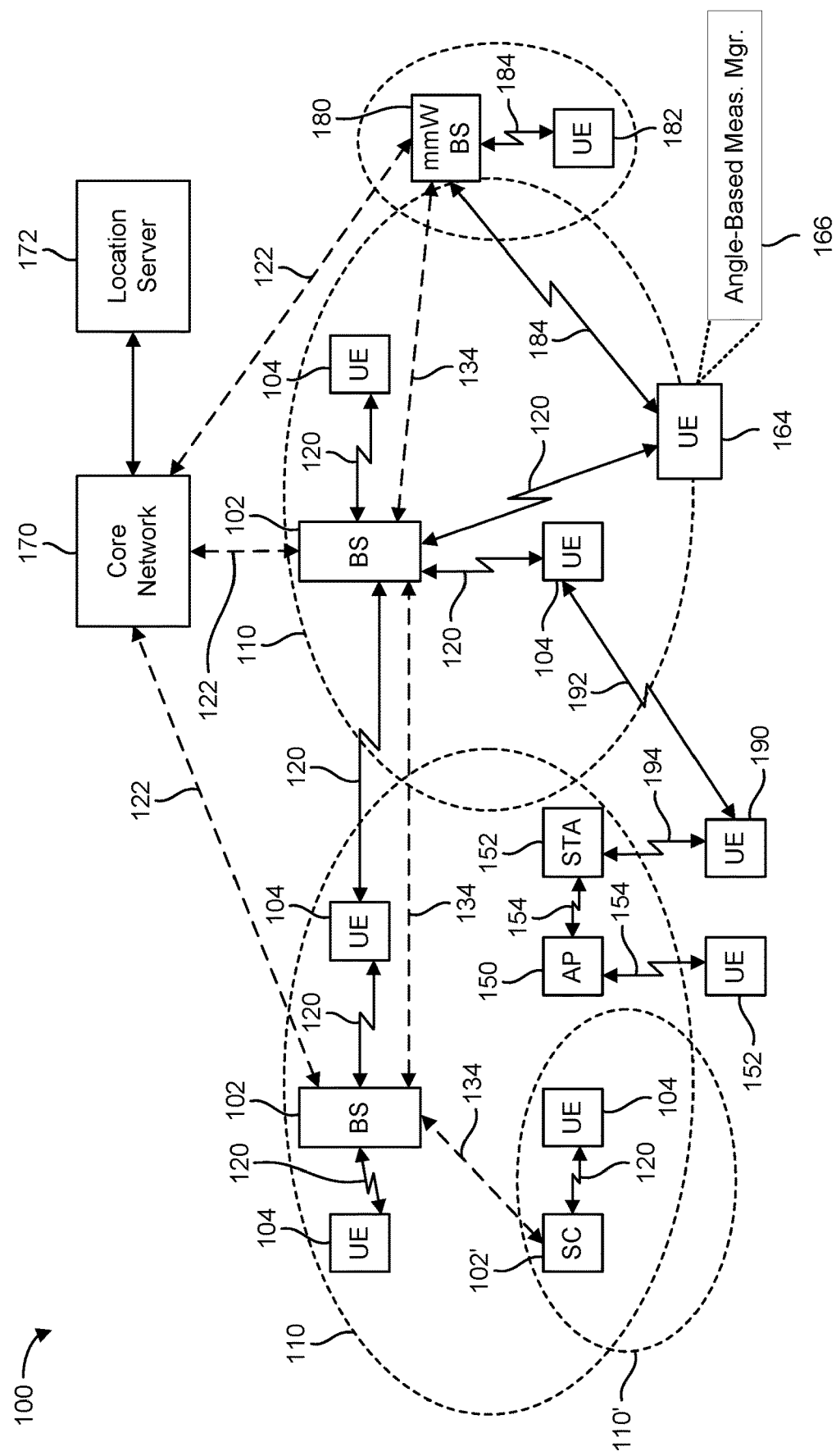
FIG. 1 illustrates an exemplary wireless communications system, according to various aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an UL/reverse or DL/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE or a neighbor base station whose reference RF signals (or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

According to various aspects, FIG. 1 illustrates an exemplary wireless communications system 100. The wireless communications system 100 (which may also be referred to as a wireless wide area network (WWAN)) may include various base stations 102 and various UEs 104. The base stations 102 may include macro cell base stations (high power cellular base stations) and/or small cell base stations (low power cellular base stations). In an aspect, the macro cell base station may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While geographic coverage areas 110 of neighboring macro cell base station 102 may partially overlap (e.g., in a handover region), some of the geographic coverage areas 110 may be substantially overlapped by a larger geographic coverage area 110. For example, a small cell base station 102' (denoted as "SC" in FIG. 1) may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be implemented through one or more carrier frequencies. Allocation of carriers may be asymmetric with respect to DL and UL (e.g., more or less carriers may be allocated for DL than for UL).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-collocated, meaning that they appear to the receiver (e.g., a UE) as having the same parameters, regardless of whether or not the transmitting antennas of the network node themselves are physically collocated. In NR, there are four types of quasi-collocation (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Receive beams may be spatially related. A spatial relation means that parameters of a transmit beam for a second reference signal can be derived from information about a receive beam for a first reference signal. For example, a UE may use a particular receive beam to receive one or more reference downlink reference signals (e.g., positioning reference signals (PRS), navigation reference signals (NRS), tracking reference signals (TRS), cell-specific reference signals (CRS), channel state information reference signals (CSI-RS), primary synchronization signals (PSS), secondary synchronization signals (SSS), synchronization signal blocks (SSBs), etc.) from a base station. The UE can then form a transmit beam for sending one or more uplink reference signals (e.g., uplink positioning reference signals (UL-PRS), sounding reference signal (SRS), demodulation reference signals (DMRS), etc.) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

In 5G, the frequency spectrum in which wireless nodes (e.g., base stations 102/180, UEs 104/182) operate is divided into multiple frequency ranges, FR1 (from 450 to 6000 MHz), FR2 (from 24250 to 52600 MHz), FR3 (above 52600 MHz), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs, such as UE 190, that connects indirectly to one or more communication networks via one or more device-to-device (D2D) peer-to-peer (P2P) links. In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164. In an aspect, the UE 164 may include an angle-based measurement manager 166 that may enable the UE 164 to perform the UE operations described herein. Note that although only one UE in FIG. 1 is illustrated as having an angle-based measurement manager 166, any of the UEs in FIG. 1 may be configured to perform the UE operations described herein.

Figure 2A:
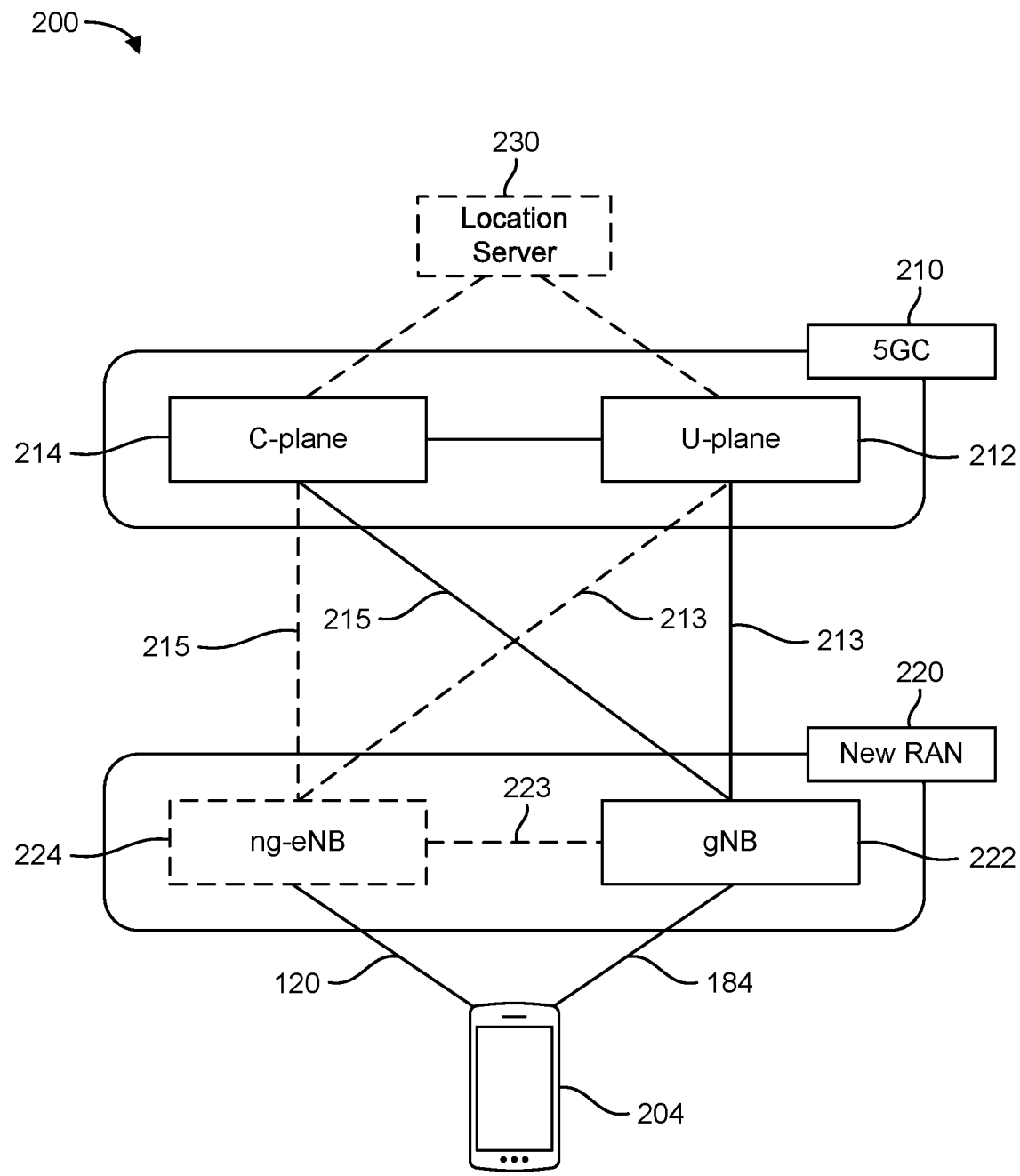
FIGS. 2A and 2B illustrate example wireless network structures, according to various aspects of the disclosure.

According to various aspects, FIG. 2A illustrates an example wireless network structure 200. For example, a 5GC 210 (also referred to as a Next Generation Core (NGC)) can be viewed functionally as control plane functions 214 (e.g., UE registration, authentication, network access, gateway selection, etc.) and user plane functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the control plane functions 214 and user plane functions 212. In an additional configuration, an ng-eNB 224 may also be connected to the 5GC 210 via NG-C 215 to the control plane functions 214 and NG-U 213 to the user plane functions 212. Further, ng-eNB 224 may directly communicate with gNB 222 via a backhaul connection 223. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). Another optional aspect may include location server 230, which may be in communication with the 5GC 210 to provide location assistance for UEs 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network.

Figure 2B:
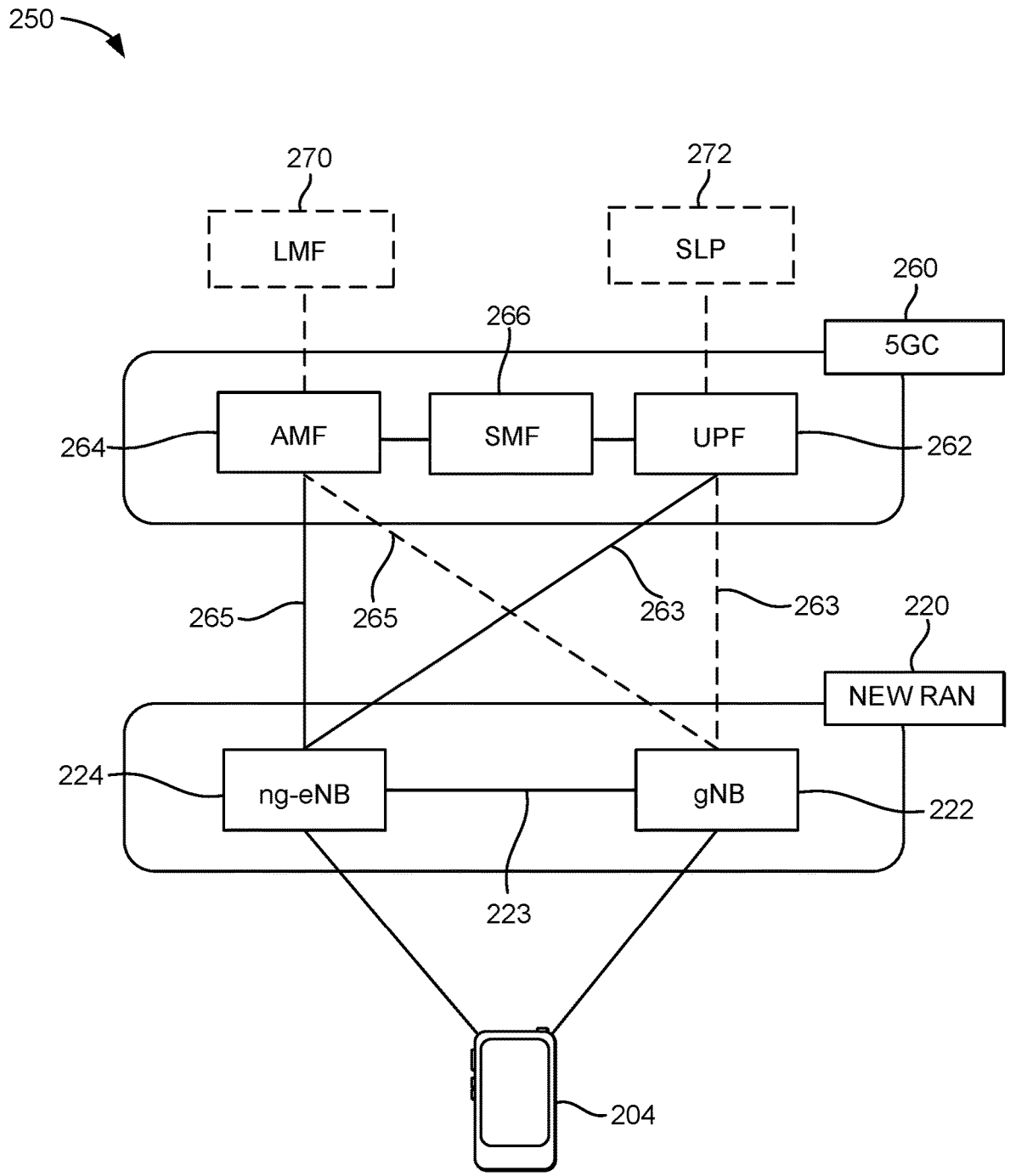

According to various aspects, FIG. 2B illustrates another example wireless network structure 250. For example, a 5GC 260 can be viewed functionally as control plane functions, provided by an access and mobility management function (AMF) 264, and user plane functions, provided by a user plane function (UPF) 262, which operate cooperatively to form the core network (i.e., 5GC 260). User plane interface 263 and control plane interface 265 connect the ng-eNB 224 to the 5GC 260 and specifically to UPF 262 and AMF 264, respectively. In an additional configuration, a gNB 222 may also be connected to the 5GC 260 via control plane interface 265 to AMF 264 and user plane interface 263 to UPF 262. Further, ng-eNB 224 may directly communicate with gNB 222 via the backhaul connection 223, with or without gNB direct connectivity to the 5GC 260. In some configurations, the New RAN 220 may only have one or more gNBs 222, while other configurations include one or more of both ng-eNBs 224 and gNBs 222. Either gNB 222 or ng-eNB 224 may communicate with UEs 204 (e.g., any of the UEs depicted in FIG. 1). The base stations of the New RAN 220 communicate with the AMF 264 over the N2 interface and with the UPF 262 over the N3 interface.

The functions of the AMF 264 include registration management, connection management, reachability management, mobility management, lawful interception, transport for session management (SM) messages between the UE 204 and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the New RAN 220 and the LMF 270, evolved packet system (EPS) bearer identifier allocation for interworking with the EPS, and UE 204 mobility event notification. In addition, the AMF 264 also supports functionalities for non-3GPP access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., UL/DL rate enforcement, reflective QoS marking in the DL), UL traffic verification (service data flow (SDF) to QoS flow mapping), transport level packet marking in the UL and DL, DL packet buffering and DL data notification triggering, and sending and forwarding of one or more "end markers" to the source RAN node (not shown). The UPF 262 may also support transfer of location services messages over a user plane between the UE 204 and a location server, such as a secure user plane location (SUPL) location platform (SLP) 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, New RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

Figure 3A:
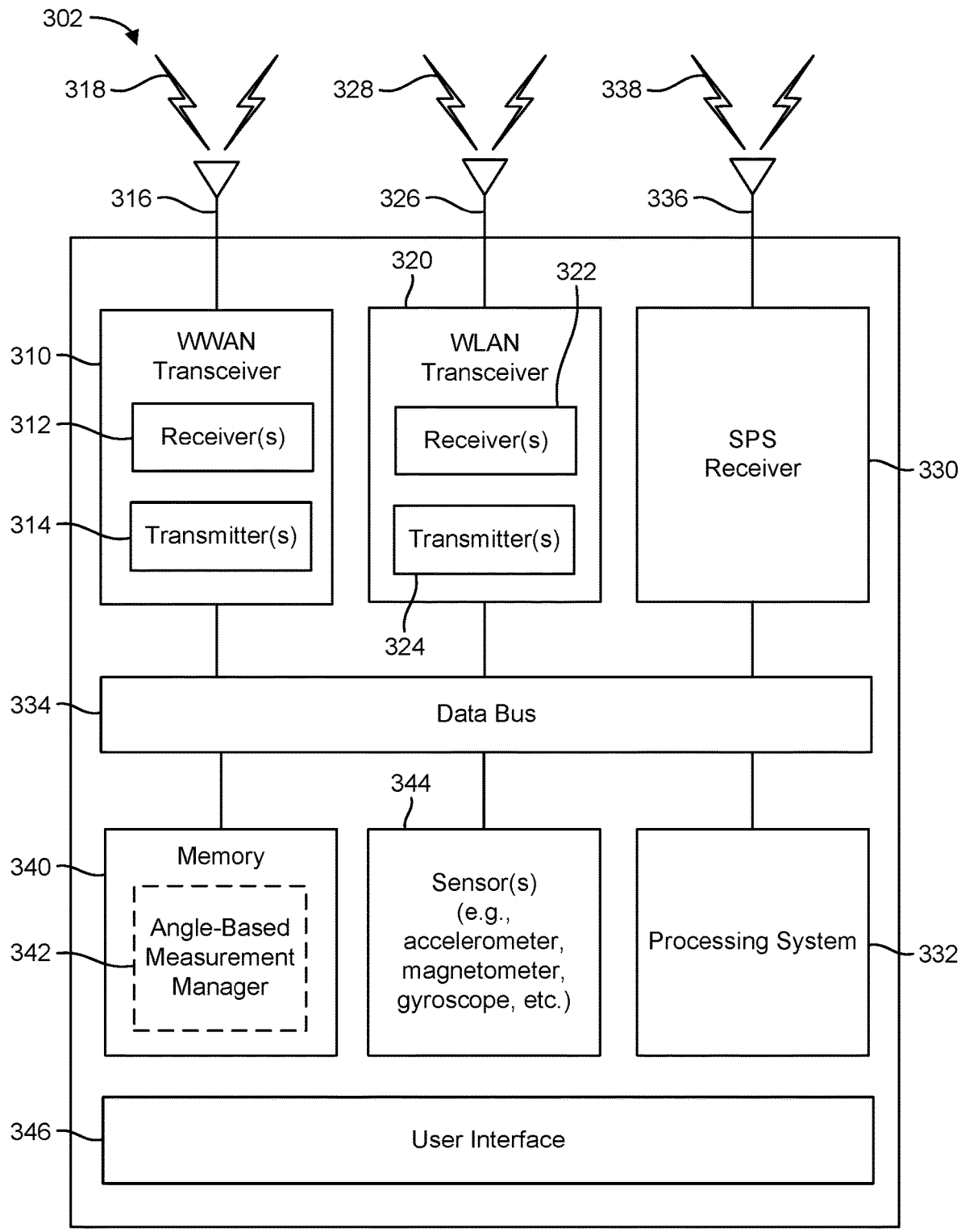
FIGS. 3A to 3C are simplified block diagrams of several sample aspects of components that may be employed in a UE, a base station, and a network entity, respectively.
Figure 3B:
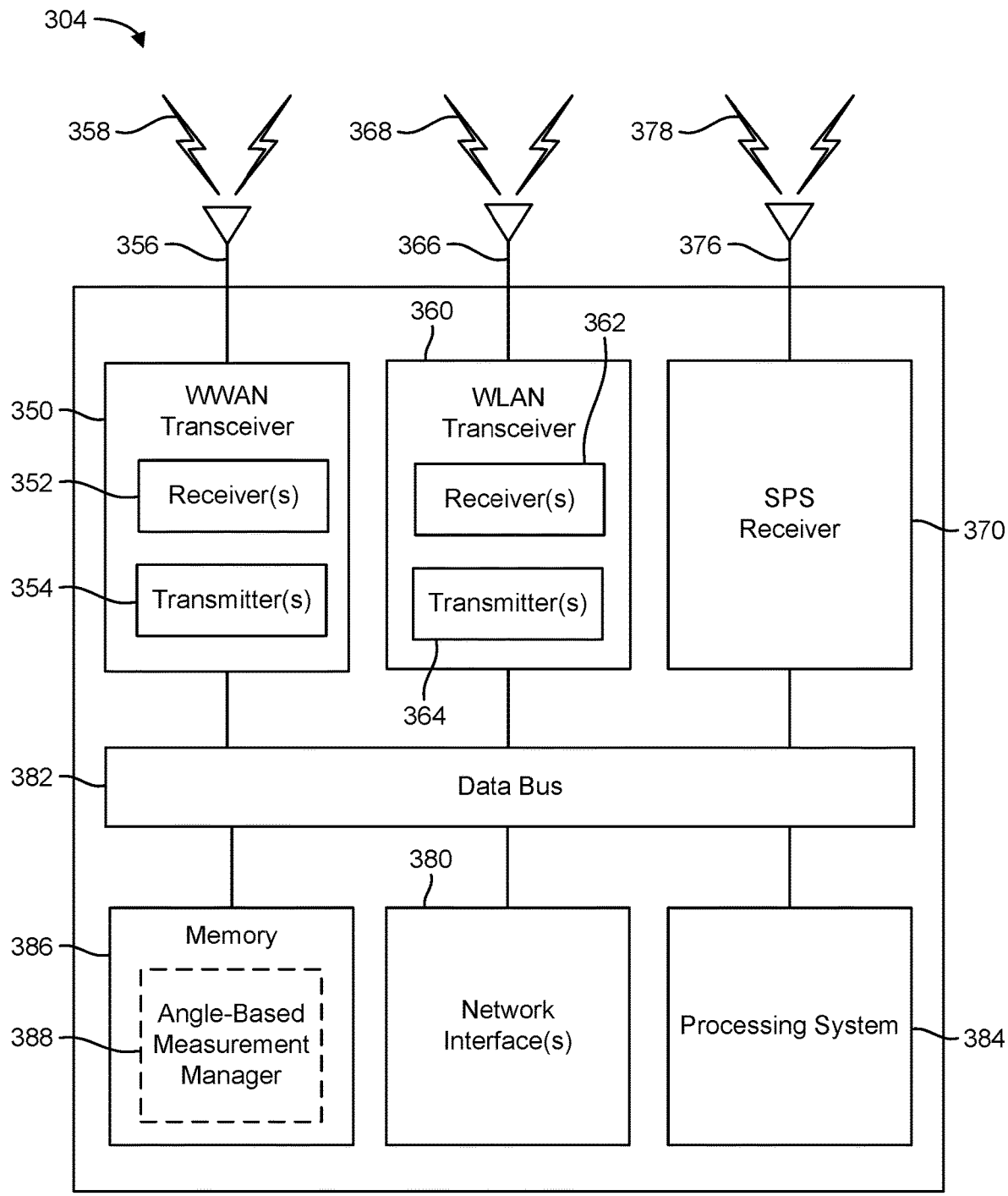
Figure 3C:
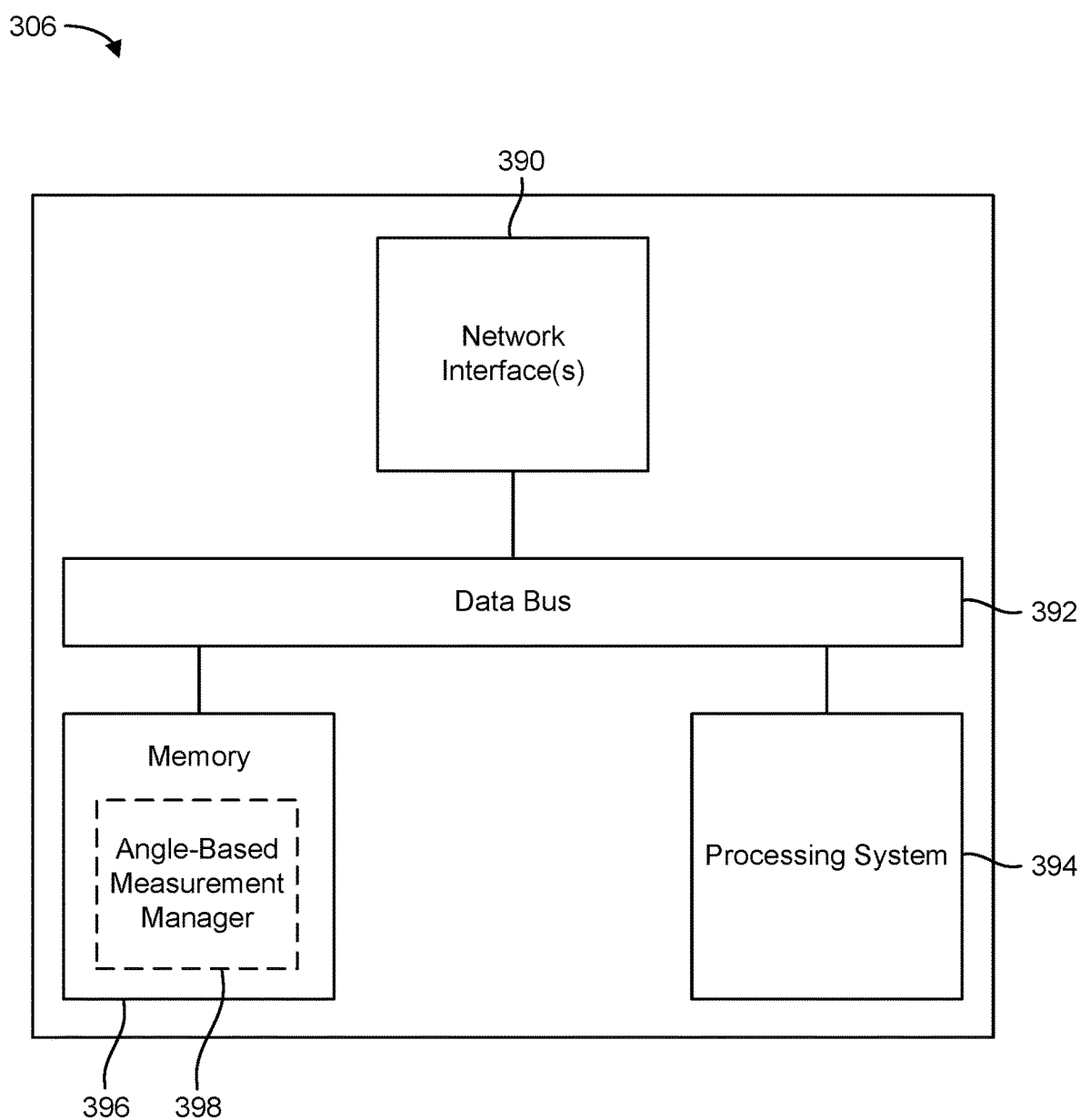

FIGS. 3A, 3B, and 3C illustrate several exemplary components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230, the LMF 270, and the SLP 272) to support the file transmission operations as taught herein. It will be appreciated that these components may be implemented in different types of apparatuses in different implementations (e.g., in an ASIC, in a system-on-chip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include wireless wide area network (WWAN) transceiver 310 and 350, respectively, configured to communicate via one or more wireless communication networks (not shown), such as an NR network, an LTE network, a GSM network, and/or the like. The WWAN transceivers 310 and 350 may be connected to one or more antennas 316 and 356, respectively, for communicating with other network nodes, such as other UEs, access points, base stations (e.g., ng-eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 also include, at least in some cases, wireless local area network (WLAN) transceivers 320 and 360, respectively. The WLAN transceivers 320 and 360 may be connected to one or more antennas 326 and 366, respectively, for communicating with other network nodes, such as other UEs, access points, base stations, etc., via at least one designated RAT (e.g., WiFi, LTE-D, Bluetooth®, etc.) over a wireless communication medium of interest. The WLAN transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively.

Transceiver circuitry including at least one transmitter and at least one receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations. In an aspect, a transmitter may include or be coupled to a plurality of antennas (e.g., antennas 316, 326, 356, 366), such as an antenna array, that permits the respective apparatus to perform transmit "beamforming," as described herein. Similarly, a receiver may include or be coupled to a plurality of antennas (e.g., antennas 316, 326, 356, 366), such as an antenna array, that permits the respective apparatus to perform receive beamforming, as described herein. In an aspect, the transmitter and receiver may share the same plurality of antennas (e.g., antennas 316, 326, 356, 366), such that the respective apparatus can only receive or transmit at a given time, not both at the same time. A wireless communication device (e.g., one or both of the transceivers 310 and 320) of the UE 302 and/or a wireless communication device (e.g., one or both of the transceivers 350 and 360) of the base station 304 may also comprise a network listen module (NLM) or the like for performing various measurements.

The UE 302 and the base station 304 also include, at least in some cases, satellite positioning systems (SPS) receivers 330 and 370. The SPS receivers 330 and 370 may be connected to one or more antennas 336 and 376, respectively, for receiving SPS signals 338 and 378, respectively, such as global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. The SPS receivers 330 and 370 may comprise any suitable hardware and/or software for receiving and processing SPS signals 338 and 378, respectively. The SPS receivers 330 and 370 request information and operations as appropriate from the other systems, and performs calculations necessary to determine positions of the UE 302 and the base station 304 using measurements obtained by any suitable SPS algorithm.

The base station 304 and the network entity 306 each include at least one network interfaces 380 and 390 for communicating with other network entities. For example, the network interfaces 380 and 390 (e.g., one or more network access ports) may be configured to communicate with one or more network entities via a wire-based or wireless backhaul connection. In some aspects, the network interfaces 380 and 390 may be implemented as transceivers configured to support wire-based or wireless signal communication. This communication may involve, for example, sending and receiving messages, parameters, and/or other types of information.

The UE 302, the base station 304, and the network entity 306 also include other components that may be used in conjunction with the operations as disclosed herein. The UE 302 includes processor circuitry implementing a processing system 332 for providing functionality relating to, for example, positioning operations, and for providing other processing functionality. The base station 304 includes a processing system 384 for providing functionality relating to, for example, positioning operations as disclosed herein, and for providing other processing functionality. The network entity 306 includes a processing system 394 for providing functionality relating to, for example, positioning operations as disclosed herein, and for providing other processing functionality. In an aspect, the processing systems 332, 384, and 394 may include, for example, one or more general purpose processors, multi-core processors, ASICs, digital signal processors (DSPs), field programmable gate arrays (FPGA), or other programmable logic devices or processing circuitry.

The UE 302, the base station 304, and the network entity 306 include memory circuitry implementing memory components 340, 386, and 396 (e.g., each including a memory device), respectively, for maintaining information (e.g., information indicative of reserved resources, thresholds, parameters, and so on). In some cases, the UE 302, the base station 304, and the network entity 306 may include angle-based measurement managers 342, 388, and 398, respectively. The angle-based measurement managers 342, 388, and 398 may be hardware circuits that are part of or coupled to the processing systems 332, 384, and 394, respectively, that, when executed, cause the UE 302, the base station 304, and the network entity 306 to perform the functionality described herein. In other aspects, the angle-based measurement managers 342, 388, and 398 may be external to the processing systems 332, 384, and 394 (e.g., part of a modem processing system, integrated with another processing system, etc.). Alternatively, the angle-based measurement managers 342, 388, and 398 may be memory modules (as shown in FIGS. 3A-C) stored in the memory components 340, 386, and 396, respectively, that, when executed by the processing systems 332, 384, and 394 (or a modem processing system, another processing system, etc.), cause the UE 302, the base station 304, and the network entity 306 to perform the functionality described herein.

The UE 302 may include one or more sensors 344 coupled to the processing system 332 to provide movement and/or orientation information that is independent of motion data derived from signals received by the WWAN transceiver 310, the WLAN transceiver 320, and/or the SPS receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in 2D and/or 3D coordinate systems.

In addition, the UE 302 includes a user interface 346 for providing indications (e.g., audible and/or visual indications) to a user and/or for receiving user input (e.g., upon user actuation of a sensing device such as a keypad, a touch screen, a microphone, and so on). Although not shown, the base station 304 and the network entity 306 may also include user interfaces.

Referring to the processing system 384 in more detail, in the downlink, IP packets from the network entity 306 may be provided to the processing system 384. The processing system 384 may implement functionality for an RRC layer, a packet data convergence protocol (PDCP) layer, a radio link control (RLC) layer, and a medium access control (MAC) layer. The processing system 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the processing system 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the processing system 332, which implements Layer-3 and Layer-2 functionality.

In the UL, the processing system 332 provides demultiplexing between transport and logical channels, packet reassembly, deciphering, header decompression, and control signal processing to recover IP packets from the core network. The processing system 332 is also responsible for error detection.

Similar to the functionality described in connection with the DL transmission by the base station 304, the processing system 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARD), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The UL transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the processing system 384.

In the UL, the processing system 384 provides demultiplexing between transport and logical channels, packet reassembly, deciphering, header decompression, control signal processing to recover IP packets from the UE 302. IP packets from the processing system 384 may be provided to the core network. The processing system 384 is also responsible for error detection.

For convenience, the UE 302, the base station 304, and/or the network entity 306 are shown in FIGS. 3A-C as including various components that may be configured according to the various examples described herein. It will be appreciated, however, that the illustrated blocks may have different functionality in different designs.

The various components of the UE 302, the base station 304, and the network entity 306 may communicate with each other over data buses 334, 382, and 392, respectively. The components of FIGS. 3A-C may be implemented in various ways. In some implementations, the components of FIGS. 3A-C may be implemented in one or more circuits such as, for example, one or more processors and/or one or more ASICs (which may each include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a positioning entity," etc. However, as will be appreciated, such operations, acts, and/or functions may actually be performed by specific components or combinations of components of the UE, base station, positioning entity, etc., such as the processing systems 332, 384, 394, the transceivers 310, 320, 350, and 360, the memory components 340, 386, and 396, the angle-based measurement managers 342, 388, and 398, etc.

NR enables several new positioning techniques in addition to legacy 4G/LTE solutions, such as angle-based positioning techniques (e.g., angle-of-arrival (AoA), angle-of-departure (AoD), zenith angle of arrival (ZoA), and zenith angle of departure (ZoD) positioning techniques), UE-based positioning techniques, and multi-cell round-trip-time (RTT) positioning techniques (also referred to as "multi-RTT"). Referring to downlink AoD positioning techniques specifically, these techniques can reuse the same downlink reference signals used for timing-based downlink-only positioning techniques, such as observed time difference of arrival (OTDOA) in LTE and downlink time difference of arrival (DL-TDOA) in NR. Such reference signals may include PRS, NRS, CRS, TRS, CSI-RS, PSS, SSS, SSBs, etc.

At a high level, to perform a DL-AoD positioning procedure, a base station ("gNB" in NR) transmits reference signals to UEs in its coverage area by beam sweeping in FR2. A UE measures some, or all, of the beams and reports the signal strength (e.g., RSRP) of each beam to the base station. The base station estimates the AoD to the UE based on the UE's signal strength report and reports the AoD to a positioning entity. The positioning entity may be located at the UE, the base station, or a location server (e.g., location server 230, LMF 270, SLP 272). The positioning entity estimates the UE's location based on the AoD reported by the base station. In some cases, there may be multiple involved base stations per UE, and each base station can report the estimated AoD to the positioning entity. The positioning entity can then further refine the estimated location of the UE based on the additional AoDs.

Figure 4:
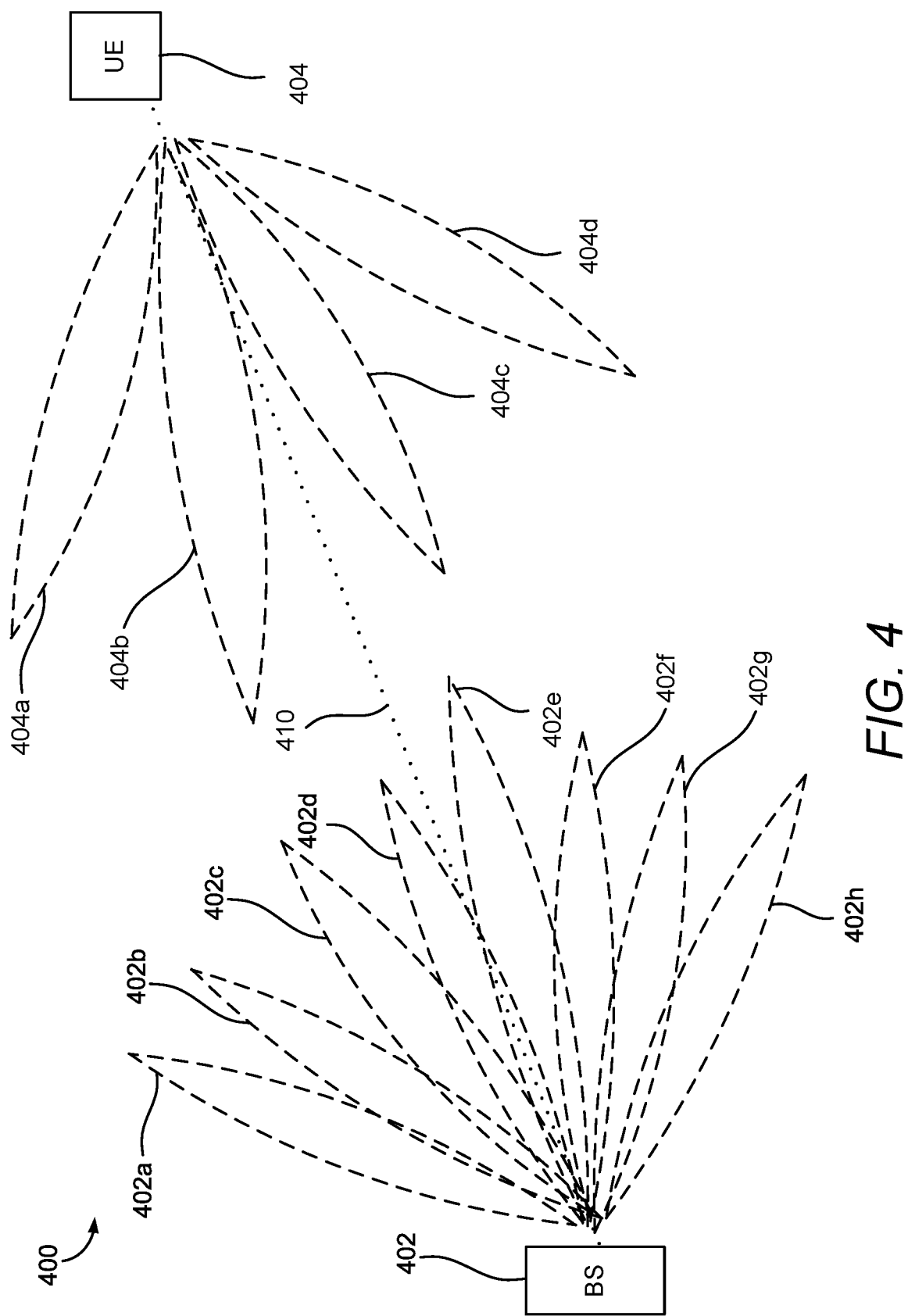
FIG. 4 is a diagram illustrating an exemplary base station in communication with an exemplary UE, according to various aspects of the disclosure.

FIG. 4 is a diagram 400 illustrating an exemplary base station (BS) 402 (which may correspond to any of the base stations described herein) in communication with an exemplary UE 404 (which may correspond to any of the UEs described herein), according to various aspects of the disclosure. Referring to FIG. 4, the base station 402 may transmit a beamformed signal to the UE 404 on one or more transmit beams 402a, 402b, 402c, 402d, 402e, 402f, 402g, 402h, each having a beam identifier that can be used by the UE 404 to identify the respective beam. Where the base station 402 is beamforming towards the UE 404 with a single array of antennas (e.g., a single TRP), the base station 402 may perform a "beam sweep" by transmitting first beam 402a, then beam 402b, and so on until lastly transmitting beam 402h. Alternatively, the base station 402 may transmit beams 402a-402h in some pattern, such as beam 402a, then beam 402h, then beam 402b, then beam 402g, and so on. Where the base station 402 is beamforming towards the UE 404 using multiple arrays of antennas (e.g., multiple TRPs), each antenna array may perform a beam sweep of a subset of the beams 402a-402h. Alternatively, each of beams 402a-402h may correspond to a single antenna or antenna array.

The UE 404 may receive the beamformed signal from the base station 402 on one or more receive beams 404a, 404b, 404c, 404d. Note that for simplicity, the beams illustrated in FIG. 4 represent either transmit beams or receive beams, depending on which of the base station 402 and the UE 404 is transmitting and which is receiving. Thus, the UE 404 may also transmit a beamformed signal to the base station 402 on one or more of the beams 404a-404d, and the base station 402 may receive the beamformed signal from the UE 404 on one or more of the beams 402a-402h.

In an aspect, the base station 402 and the UE 404 may perform beam training to align the transmit and receive beams of the base station 402 and the UE 404. For example, depending on environmental conditions and other factors, the base station 402 and the UE 404 may determine that the best transmit and receive beams are 402d and 404b, respectively, or beams 402e and 404c, respectively. The direction of the best transmit beam for the base station 402 may or may not be the same as the direction of the best receive beam, and likewise, the direction of the best receive beam for the UE 404 may or may not be the same as the direction of the best transmit beam. Note, however, that aligning the transmit and receive beams is not necessary to perform an AoD positioning procedure.

To perform an AoD positioning procedure, the base station 402 may transmit reference signals (e.g., PRS, NRS, CRS, TRS, CSI-RS, PSS, SSS, etc.) to the UE 404 on one or more of beams 402a-402h, with each beam having a different weight. The different weights of the beams will result in different received signal strengths (e.g., RSRP, RSRQ, SINR, etc.) at the UE 404. Further, the channel impulse response will be smaller for transmit beams that are further from the actual line of sight (LOS) path 410 between the base station 402 and the UE 404 than for transmit beams that are closer to the LOS path 410. Likewise, the received signal strength will be lower for transmit beams that are further from the LOS path 410 than for transmit beams that are closer to the LOS path 410.

In the example of FIG. 4, if the base station 402 transmits reference signals to the UE 404 on beams 402c, 402d, 402e, then transmit beam 402d is best aligned with the LOS path 410, while transmit beams 402c and 402e are not. As such, beam 402d will have a stronger channel impulse response and higher received signal strength at the UE 404 than beams 402c and 402e. The UE 404 can report the channel impulse response and received signal strength of each measured transmit beam 402c, 402d, 402e to the base station 402, or alternatively, the identity of the transmit beam having the strongest channel impulse response and highest received signal strength (beam 402d in the example of FIG. 4). In either case, the base station 402 can estimate the angle from itself to the UE 404 as the AoD of the transmit beam having the highest received signal strength and strongest channel impulse response at the UE 404, here, transmit beam 402d.

In one aspect of AoD-based positioning, where there is only one involved base station 402, the base station 402 and the UE 404 can perform an RTT procedure (as discussed below with reference to FIG. 5) to determine the distance between the base station 402 and the UE 404. Thus, the base station 402 (or location server or other positioning entity) can determine both the direction to the UE 404 (using AoD positioning) and the distance to the UE 404 (using RTT positioning) to estimate the location of the UE 404. Note that the AoD of the transmit beam having the highest received signal strength and strongest channel impulse response does not necessarily lie along the LOS path 410, as shown in FIG. 4. However, for AoD-based positioning purposes, it is assumed to do so.

In another aspect of AoD-based positioning, where there are multiple involved base stations 402, each base station 402 reports the determined AoD to the UE 404 to the positioning entity (e.g., a location server, the serving base station 402, the UE 404). The positioning entity receives multiple such AoDs from a plurality of involved base stations 402 (or other geographically separated transmission points) for the UE 404. With this information, and knowledge of the base stations' 402 geographic locations, the positioning entity can estimate a location of the UE 404 as the intersection of the received AoDs. There should be at least three involved base stations 402 for a two-dimensional (2D) location solution, but as will be appreciated, the more base stations 402 that are involved in the positioning procedure, the more accurate the estimated location of the UE 404 will be.

A UE and at least three base stations (or other transmission points) may also perform an RTT positioning procedure to determine a location estimate of the UE. In a network-centric RTT estimation, the serving base station instructs the UE to, or notifies the UE that it may, scan for/receive the RTT measurement signals from two or more neighboring base stations (and typically the serving base station, as at least three base stations are needed).

Figure 5:
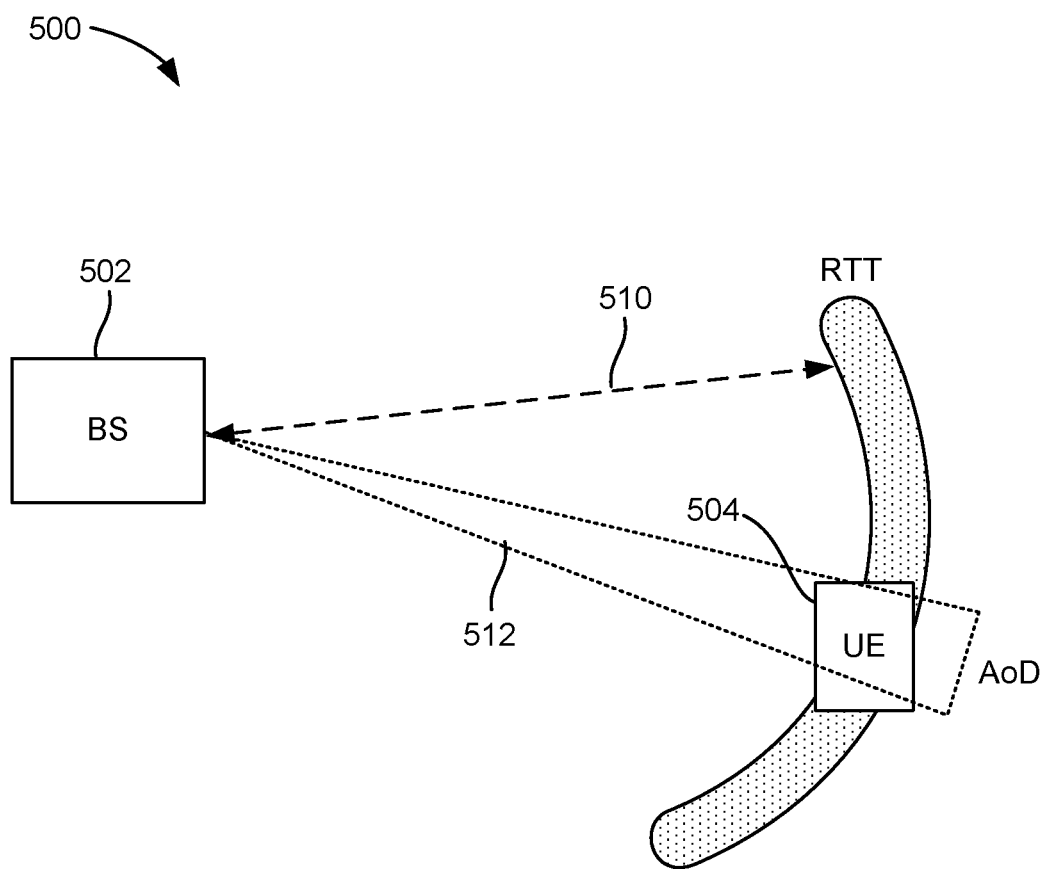
FIG. 5 is a diagram illustrating an exemplary technique for determining a position of a UE using information obtained from a plurality of base stations, according to various aspects of the disclosure.

FIG. 5 illustrates an exemplary wireless communications system 500 according to aspects of the disclosure. In the example of FIG. 5, a UE 504 (which may correspond to any of the UEs described herein) is attempting to calculate an estimate of its location, or assist another positioning entity (e.g., a serving base station or core network component, another UE, a location server, a third party application, etc.) to calculate an estimate of its location. The UE 504 may communicate wirelessly with a base station (BS) 502 (e.g., any of the base stations described herein) using RF signals and standardized protocols for the modulation of the RF signals and the exchange of information packets.

To support location estimates, the base station 502 may broadcast reference signals (e.g., PRS, NRS, CRS, TRS, CSI-RS, SSB, PSS, SSS, etc.) to UEs 504 in its coverage area to enable a UE 504 to measure characteristics of such reference signals. For example, the UE 504 may measure the time of arrival (ToA) and signal strength (e.g., RSRP) of specific reference signals transmitted by the base station 502 in order to perform RTT and/or DL-AoD positioning methods with the base station 502. Note that although described as the UE 504 measuring characteristics of reference signals from the base station 502, the UE 504 may measure reference signals from one of multiple cells or TRPs supported by the base station 502.

The distance 510 between the UE 504 and the base station 502 can be determined using an RTT positioning procedure. Specifically, as is known in the art, the RTT of RF signals exchanged between the UE 504 and the base station 502 can be used to calculate a distance 510 that defines a radius around the base station 502. The location of the UE 504 is assumed to lie on that radius with some amount of uncertainty. To further refine the estimated location of the UE 504, the base station 502 and the UE 504 can also perform an AoD positioning procedure (as described above with reference to FIG. 4) to determine the angle between the base station 502 and the UE 504. Specifically, the UE 504 may determine and report the identity of the downlink transmit beam 512 that provides the highest signal strength and/or strongest channel impulse response for the reference signals received from the base station 502, as discussed above with reference to FIG. 4.

The results of the RTT and DL-AoD positioning procedures, or the measurements taken during these procedures, are forwarded to the positioning entity, which may be the UE 504, the base station 502, the serving base station (if not base station 502), or a location server (e.g., location server 230, LMF 270, SLP 272). In order to determine the location (e.g., in x-y or x-y-z coordinates) of the UE 504, the positioning entity also needs to know the location of the base station 502. Where the UE 504 determines its location, the location of the base station 502 may be provided to the UE 504 by the base station 502 or a location server with knowledge of the base station's 502 location (e.g., location server 230, LMF 270, SLP 272). Otherwise, the location of the base station 502 should be known to the base station 502 or the location server.

Once the RTT and AoD positioning procedures have been performed, the positioning entity can solve for the location of the UE 504 using the angle to the UE 504 (from the AoD positioning procedure), the distance to the UE 504 (from the RTT positioning procedure), and the known location of the base station 502. Where only the measurements from the RTT and AoD positioning procedures were reported, the positioning entity first calculates the distance and angle between the base station 502 and the UE 504, and then calculates the location of the UE 504 using those results.

Figure 6:
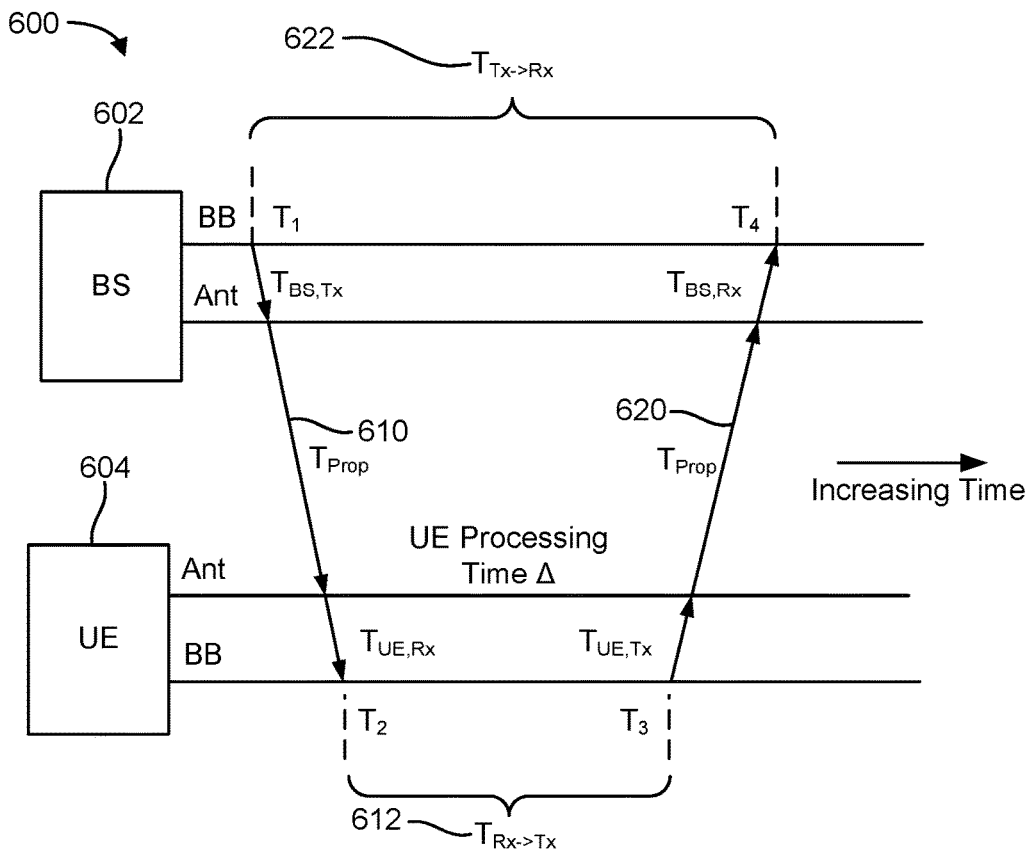
FIG. 6 is a diagram showing exemplary timings of round-trip-time measurement signals exchanged between a base station and a UE, according to aspects of the disclosure.

FIG. 6 is a diagram 600 showing exemplary timings of RTT measurement signals exchanged between a base station 602 (which may correspond to any of the base stations described herein) and a UE 604 (which may correspond to any of the UEs described herein), according to aspects of the disclosure. In the example of FIG. 6, the base station 602 sends an RTT measurement signal 610 (e.g., PRS, NRS, CRS, CSI-RS, etc.) to the UE 604 at time $T_1$. There is a transmission delay of $T_{BS,Tx}$ between the time the base station's 602 baseband ("BB") generates the RTT measurement signal 610 and the antenna ("Ant") transmits the RTT measurement signal 610. The RTT measurement signal 610 has some propagation delay $T_{Prop}$ as it travels from the base station 602 to the UE 604.

Upon reception of the RTT measurement signal 610 at the UE 604, there is a delay of $T_{UE,Rx}$ between the time the UE's 604 antenna receives/detects the RTT measurement signal 610 and the time the baseband processes the RTT measurement signal 610 at time $T_2$ (considered as the ToA of the RTT measurement signal 610 at the UE 604). After some UE processing time $T_{Rx \rightarrow Tx}$ 612, the UE 604 transmits an RTT response signal 620 at time $T_3$. There is a transmission delay of $T_{UE,Tx}$ between the time the UE's 604 baseband generates the RTT response signal 620 and the antenna transmits the RTT response signal 620.

After the propagation delay $T_{Prop}$, the base station's 602 antenna receives/detects the RTT response signal 620. There is a reception delay of $T_{BS,Rx}$ between the time the antenna receives/detects the RTT response signal 620 and the time the baseband processes the RTT response signal 620 at time $T_4$ (considered as the ToA of the RTT response signal 620 at the base station 602).

The RTT response signal 620 may explicitly include the difference between time $T_3$ and time $T_2$ (i.e., $T_{Rx \rightarrow Tx}$ 612). Alternatively, it may be derived from the timing advance (TA), i.e., the relative uplink/downlink frame timing and specification location of uplink reference signals. Note that the TA is usually the RTT between the base station and the UE, or double the propagation time in one direction. Using this measurement and the difference between time $T_4$ and time $T_1$ (i.e., $T_{Tx \rightarrow Rx}$ 622), the base station 602 can calculate the distance to the UE 604 as:

$$d = \frac{1}{2c}(T_{Tx \rightarrow Rx} - T_{Rx \rightarrow Tx}) = \frac{1}{2c}(T_4 - T_1) - \frac{1}{2c}(T_3 - T_2)$$

where c is the speed of light.

Generally, the UE 604 calibrates its RF front end (RFFE) group delays and compensates for them so that the RTT report reflects the delay from its antennas. The base station 602 subtracts the calibrated RFFE group delays to determine the final distance between the base station 602 and the UE 604.

The base station 602 and/or the UE 604 may report the RTTs to the location server (or other positioning entity) to enable the location server to estimate the location of the UE 604 based on the RTT and the known location of the base station 602. As described above with reference to FIG. 5, to provide a more accurate estimate of the UE's 604 location, the location server can combine the results of an AoD positioning procedure performed between the base station 602 and the UE 604 with the results of the RTT positioning procedure. Thus, the location server can determine both the direction to the UE 604 from the base station 602 (using AoD positioning) and the distances to the UE 604 from the base stations 602 (using RTT positioning) to better estimate the location of the UE 604.

Figure 7:
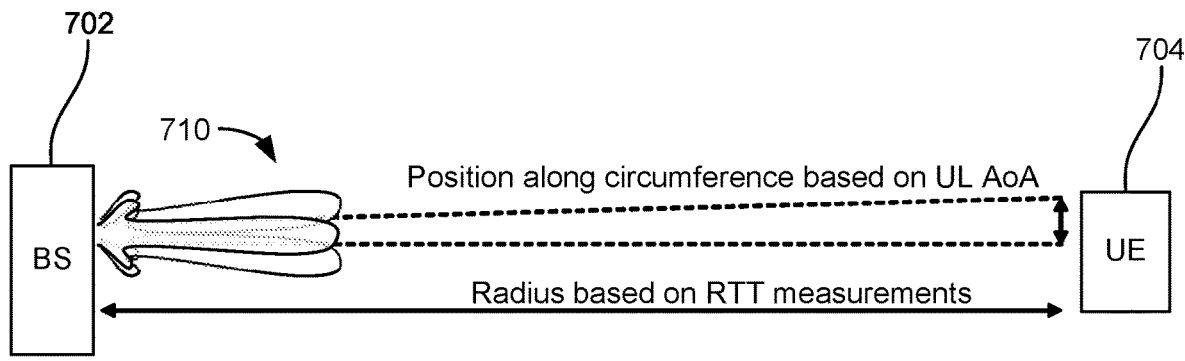
FIG. 7 illustrates an exemplary uplink angle-of-arrival (UL-AoA) based positioning procedure, according to various aspects of the disclosure.

FIG. 7 illustrates an exemplary UL-AoA positioning procedure, according to aspects of the disclosure. In the example of FIG. 7, a base station 702 (e.g., any of the base stations described herein) receives one or more reference signals (e.g., UL-PRS, SRS, DMRS, etc.) from a UE 704 (e.g., any of the UEs described herein) on a plurality of uplink receive beams 710. The base station 702 determines the angle of the best receive beams 710 used to receive the one or more reference signals from the UE 704 as the AoA from itself to the UE 704. Specifically, each of the receive beams 710 will result in a different received signal strength (e.g., RSRP, RSRQ, SINR, etc.) of the one or more reference signals at the base station 702. Further, the channel impulse response of the one or more reference signals will be smaller for receive beams 710 that are further from the actual LOS path between the base station 702 and the UE 704 than for receive beams 710 that are closer to the LOS path. Likewise, the received signal strength will be lower for receive beams 710 that are further from the LOS path than for receive beams 710 that are closer to the LOS path. As such, the base station 702 identifies the receive beam 710 that results in the highest received signal strength and the strongest channel impulse response, and estimates the angle from itself to the UE 704 as the AoA of that receive beam 710. Note that as with AoD-based positioning, the AoA of the receive beam 710 resulting in the highest received signal strength and strongest channel impulse response does not necessarily lie along the LOS path. However, for AoA-based positioning purposes, it is assumed to do so.

The base station 702 can also estimate the distance between itself and the UE 704 by performing an RTT positioning procedure with the UE 704 or from the timing advance for the UE 704. As noted above, the timing advance is typically the RTT between a base station and a UE, or double the propagation time in one direction, and therefore, can be used to estimate the distance between the base station 702 and the UE 704 the same as an actual RTT procedure.

Where the UE 704 is estimating its location (i.e., the UE is the positioning entity), it needs to obtain the geographic location of the base station 702. The UE 704 may obtain the location from, for example, the base station 702 itself or a location server (e.g., location server 230, LMF 270, SLP 272). With the knowledge of the distance to the base station 702 (based on the RTT or timing advance), the angle between the base station 702 and the UE 704 (based on the AoA of the best receive beam 710), and the known geographic location of the base station 702, the UE 704 can estimate its location.

Alternatively, where a positioning entity, such as the base station 702 or a location server, is estimating the location of the UE 704, the base station 702 reports the AoA of the receive beam 710 resulting in the highest received signal strength and strongest channel impulse response of the reference signals received from the UE 704, or all received signal strengths and channel impulse responses for all receive beams 710 (which allows the positioning entity to determine the best receive beam 710). The base station 702 may additionally report the distance to the UE 704. The positioning entity can then estimate the location of the UE 704 based on the UE's 704 distance to the base station 702, the AoA of the identified receive beam 710, and the known geographic location of the base station 702.

A location estimate (e.g., for a UE 504) may be referred to by other names, such as a position estimate, location, position, position fix, fix, or the like. A position estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence). The means of obtaining a location estimate may be referred to generically as "positioning," "locating," or "position fixing." A particular solution for obtaining a location estimate may be referred to as a "location solution." A particular method for obtaining a location estimate as part of a location solution may be referred to as, for example, a "location method" or as a "positioning method."

Figure 8:
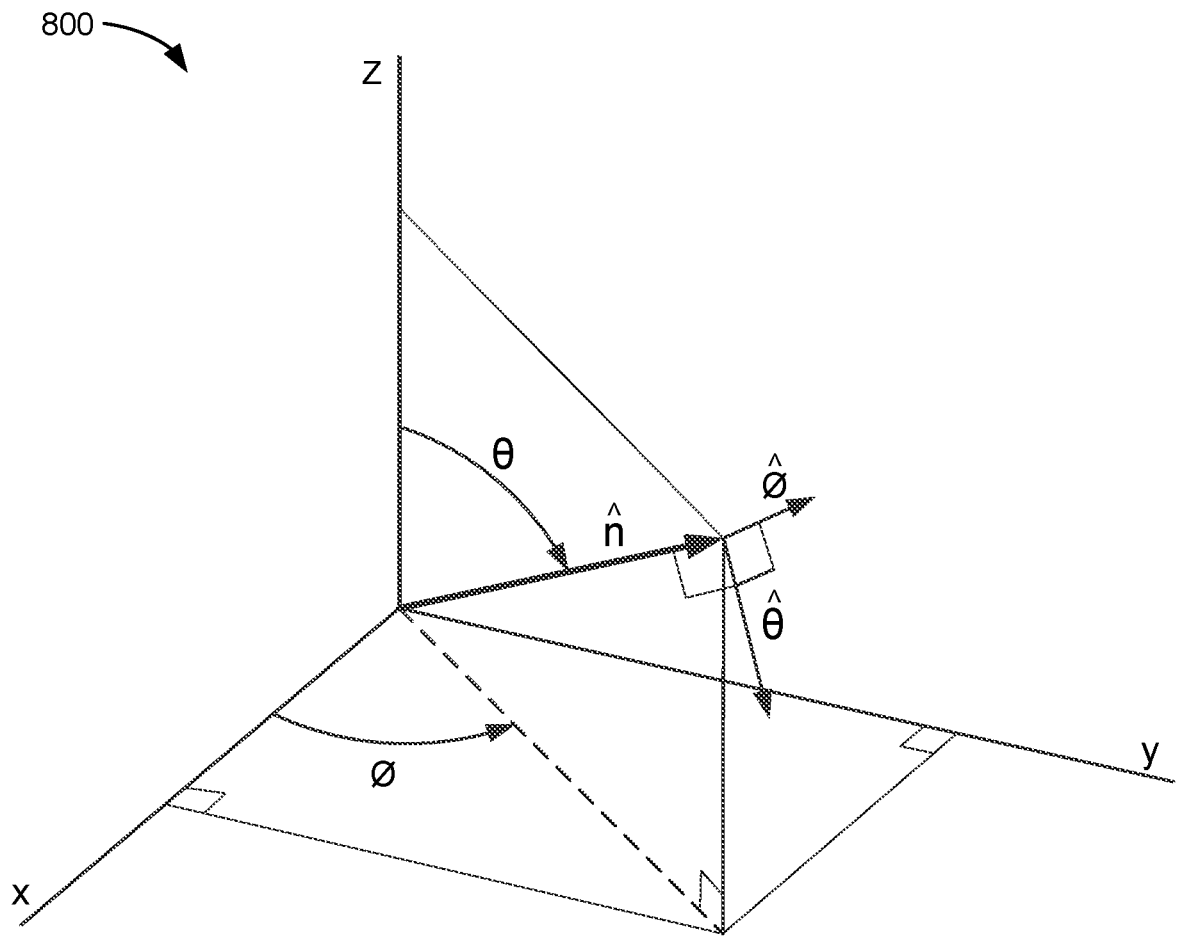
FIG. 8 illustrates the definition of a coordinate system by the x, y, z axes, the spherical angles, and the spherical unit vectors, according to aspects of the disclosure.

When a base station or a UE reports measured/estimated/derived/computed angle values (e.g., AoD, AoA) to the positioning entity (e.g., the serving base station, location server 230, LMF 270, SLP 272), it can report the angle values in either a local coordinate system (LCS) or a global coordinate system (GCS). A coordinate system is defined by the x, y, z axes, the spherical angles and the spherical unit vectors, as shown in FIG. 8. FIG. 8 illustrates the definition of spherical angles and spherical unit vectors in a Cartesian coordinate system 800, according to aspects of the disclosure. In FIG. 8, $\theta$ is the zenith angle and $\phi$ is the azimuth angle in the Cartesian coordinate system 800. Further, $\hat{n}$ is the given direction, and $\hat{\theta}$ and $\hat{\phi}$ are the spherical basis vectors. Note that $\theta=0$ points to the zenith and $\theta=90°$ points to the horizon. The field component in the direction of $\hat{\theta}$ is given by $F_\theta$ and the field component in the direction of $\hat{\phi}$ is given by $F_\phi$.

A GCS is defined for a system comprising multiple base stations and UEs. An array antenna for a base station or a UE can be defined in an LCS. A GCS has an absolute reference frame (e.g., in terms of absolute latitude and longitude), whereas an LCS has a relative reference frame (e.g., relative to a vehicle, a base station, an antenna array, etc.). An LCS is used as a reference to define the vector far-field, that is pattern and polarization, of each antenna element in an array. It is assumed that the far-field is known in the LCS by formulae. The placement of an antenna array within the GCS is defined by the translation between the GCS and the LCS for the antenna array. The orientation of the antenna array with respect to the GCS is defined in general by a sequence of rotations (described in 3GPP Technical Specification (TS) 38.900, which is publicly available and which is incorporated by reference herein in its entirety). Since this orientation is in general different from the GCS orientation, it is necessary to map the vector fields of the array elements from the LCS to the GCS. This mapping depends on the orientation of the array and is given by the equations in 3GPP TS 38.900. Note that any arbitrary mechanical orientation of the array can be achieved by rotating the LCS with respect to the GCS.

Figure 9A:
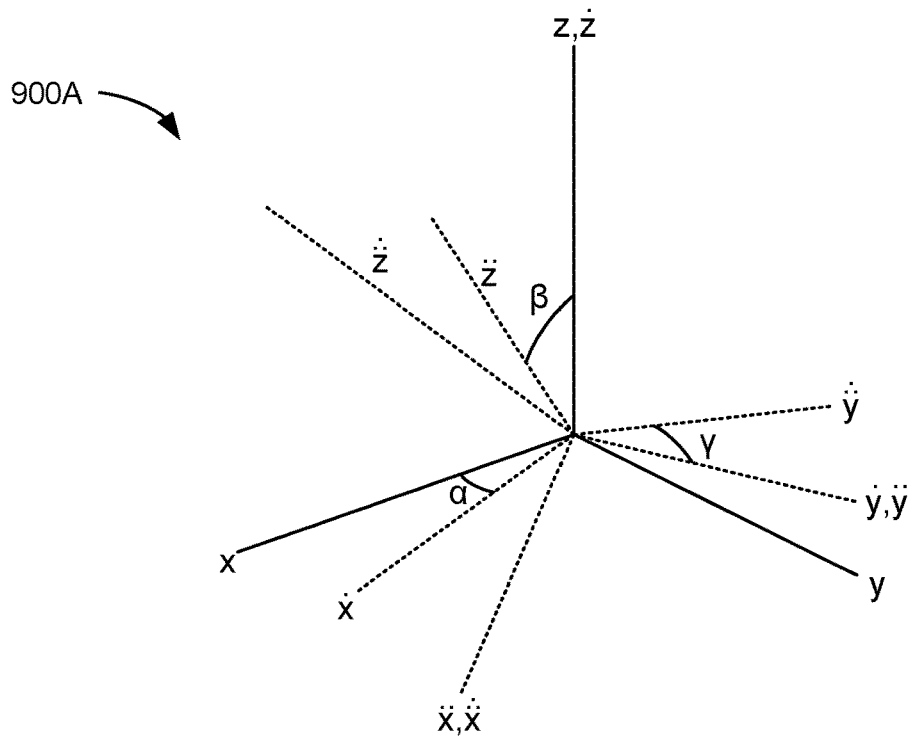
FIG. 9A illustrates the sequence of rotations that relate a GCS and a LCS, according to aspects of the disclosure.
Figure 9B:
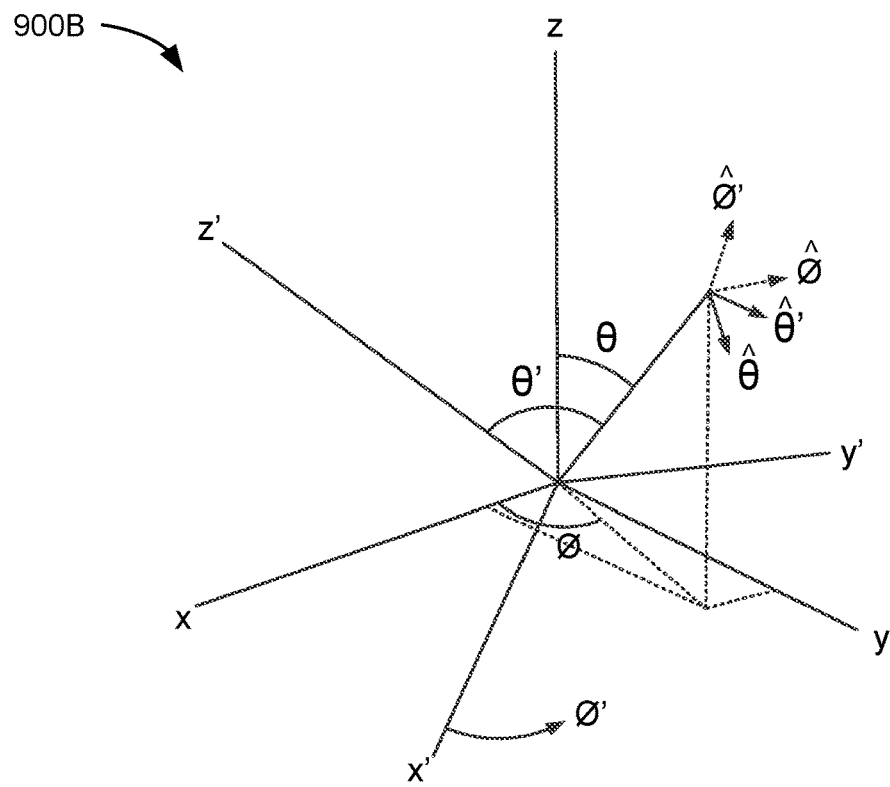
FIG. 9B illustrates the definition of spherical coordinates and unit vectors in both the GCS and LCS, according to aspects of the disclosure.

In FIGS. 9A and 9B, a GCS with coordinates (x, y, z, $\theta$, $\phi$) and unit vectors ($\hat{\theta}$, $\hat{\phi}$), and an LCS with "primed" coordinates (x', y', z', $\theta'$, $\phi'$) and "primed" unit vectors ($\hat{\theta}'$, $\hat{\phi}'$), are defined with a common origin. FIG. 9A illustrates the sequence of rotations that relate the GCS coordinates (x, y, z) and the LCS coordinates ($\dddot{x}, \dddot{y}, \dddot{z}$), according to aspects of the disclosure. More specifically, FIG. 9A illustrates an arbitrary three-dimensional (3D) rotation of the LCS with respect to the GCS given by the angles $\alpha$, $\beta$, $\gamma$. The set of angles $\alpha$, $\beta$, $\gamma$ can also be termed as the orientation of the antenna array with respect to the GCS. Any arbitrary 3D rotation can be specified by at most three elemental rotations, and following the framework of FIG. 9A, a series of rotations about the z, $\dot{y}$, and $\ddot{x}$ axes are assumed, in that order. The dotted and double-dotted marks indicate that the rotations are intrinsic, which means that they are the result of one ($\cdot$) or two ($\cdot\cdot$) intermediate rotations. In other words, the $\dot{y}$ axis is the original y axis after the first rotation about the z axis, and the $\ddot{x}$ axis is the original x axis after the first rotation about the z axis and the second rotation about the $\dot{y}$ axis.

A first rotation of $\alpha$ about z sets the antenna bearing angle (i.e., the sector pointing direction for a base station antenna element). The second rotation of $\beta$ about $\dot{y}$ sets the antenna downtilt angle. Finally, the third rotation of $\gamma$ about $\ddot{x}$ sets the antenna slant angle. The orientation of the x, y, and z axes after all three rotations can be denoted as $\dddot{x}$, $\dddot{y}$, and $\dddot{z}$. These triple-dotted axes represent the final orientation of the LCS, and for notational purposes, are denoted as the x', y', and z' axes (local or "primed" coordinate system). Note that the transformation from an LCS to a GCS depends only on the angles $\alpha$, $\beta$, $\gamma$. The angle $\alpha$ is called the bearing angle, $\beta$ is called the downtilt angle, and $\gamma$ is called the slant angle.

FIG. 9B illustrates the definition of spherical coordinates and unit vectors in both the GCS and LCS, according to aspects of the disclosure. FIG. 9B shows the coordinate direction and unit vectors of the GCS coordinates (x, y, z) and the LCS coordinates (x', y', z'). Note that the vector fields of the antenna array elements are defined in the LCS.

As noted above, when a base station or a UE reports angle values (e.g., AoD, AoA) to the positioning entity, it reports the angle values in either its LCS or the GCS of the network. There are benefits of reporting measurements in an LCS, as well as benefits of reporting measurements in a GCS. A reason to use the GCS is that it is already supported in LTE systems (e.g., for AoA-based positioning, as described above with reference to FIG. 7). In addition, the entity performing the measurement(s) (which are always performed in the measuring entity's LCS) is responsible for transforming the measurement to the GCS. Further, using the GCS may facilitate easier UE-based positioning, assisted by DL-AoD or UL-AoA measurements at the base station, since the UE would simply need to be forwarded the GCS-based angles and the formulae to perform the transformation(s) from its own LCS to the GCS.

As a reason to use an LCS to report angle values, the entity reporting the angle measurements may not be aware of its own orientation, or have a way to transform its LCS to the GCS, and therefore, the entity can only report measurements in its LCS. Such an entity may be, for example, a base station without a base station almanac (BSA) indicating, for example, its antenna tilt and/or rotation, or a UE that is not aware of its orientation because, for example, it does not have a gyroscope, an accelerometer, and/or a magnetometer.

Due to the benefits of reporting measurements in the GCS in some cases and in an LCS in other cases, the present disclosure provides techniques in which both options are permitted and the choice of which is used is configured according to the particular situation. For example, signaling between a base station and a location server (e.g., location server 230, LMF 270, SLP 272), or between a UE and the location server, can be used to choose between GCS-based or LCS-based angle measurement reporting.

For example, a base station and a location server may communicate over an NR positioning protocol type A (NRPPa) session or an LTE positioning protocol type A (LPPa) session. In an aspect, if the location server requests the base station to provide measurements in a specific coordinate system, the location server can include an "LCSorGCSReport" field in the MeasurementQuantitiesValue message of an NRPPa session. Or, if the base station reports measurements in the coordinate system it has chosen, it can add an "LCSorGCSReport" field to the MeasuredResultsValue message of the NRPPa session. The LCSorGCSReport value could take one of two values, '0' or '1' with the meaning of these bits (e.g., '1'=GCS and '0'=LCS or vice versa) specified in the applicable standard or negotiated between the base station and the location server. Additionally, the LCSorGCSReport field could be optional, and whenever it is present, it is interpreted as one of the two values (i.e., LCS or GCS).

A UE and a location server may communicate over an LTE positioning protocol (LPP) session (or NR equivalent). If the UE reports the angle measurements to the location server, the UE can include an LCSorGCSReport field in an LPP message, similar to the NRPPa messaging between the base station and the location server. Alternatively, if the location server directs the UE regarding which coordinate system to use, it may include an LCSorGCSReport field in an LPP message, similar to the NRPPa messaging between the base station and the location server.

In a first configuration disclosed herein, the angle reporting entity (e.g., a base station or a UE) can report angle measurements to the location server in its LCS, and in a second configuration, the reporting entity can report angle measurements to the location server in the GCS of the network. Referring to the first configuration, if the reporting entity is a UE, the UE can report angle measurements (e.g., DL-AoA, DL-ZoA, UL-AoD, UL-ZoD) in its LCS to the location server over LPP signaling. This configuration may be chosen when, for example, the UE is not able to determine its orientation (e.g., due to not having a gyroscope, an accelerometer, and/or a magnetometer), and therefore, can only send LCS-based angle measurements to the location server. Because the UE may not know its orientation, it should provide additional information to the location server to assist the location server in converting the angle measurements reported in the UE's LCS to GCS angle measurements.

As a first option for such assistance information, the UE may provide an indication of which measurements in the measurement report were taken with the same UE orientation. As a second option, the UE may indicate, or the location server may assume, that all the measurements within a given measurement report were taken with the same UE orientation. Alternatively or additionally, the UE may timestamp each angle measurement and, additionally, provide the time(s) at which its orientation changed. With that information, the location server can, upon determining the UE's orientation(s) in the GCS during the measurement period, associate the timestamped angle measurements with the correct orientation.

Alternatively or additionally, the location server may determine the UE's orientation from other sources outside of the cellular system. For example, it could use reporting from other applications, such as a navigation application, to determine the orientation of the UE. Alternatively or additionally, the location server could make certain assumptions and blindly (e.g., based on previously available positioning of the UE) estimate probabilities of a new location of the UE for different hypothesis of the orientation of the UE. Knowing that at least the orientation has not changed would be helpful to perform such blind estimation of both the orientation and location of the UE by exploiting the fact that the measurements need to be consistent when the orientation has not changed.

As a third option, the UE may know that its orientation has changed, even if it is not able to determine its precise orientation. In that case, the UE may report that its orientation changed during the measurement period, and, optionally, between which of the reported measurements. As a fourth option, the UE may be able to not only detect that its orientation has changed, but may also be able to measure the change. The UE may not, however, be able to measure its absolute orientation (e.g., if the UE has a gyroscope and an accelerometer but not a magnetometer). In this case, the UE could report the detected change in orientation along with the angle measurements.

In an aspect, the UE may send separate signaling to the location server regarding the UE's orientation (assuming that the UE has sensors that were able to measure its orientation) to enable the location server to convert the UE's LCS to the GCS and execute the positioning algorithm. This signaling could use a different protocol other than LPP, such as application layer messaging or out-of-band signaling (e.g., a RAT-independent procedure). It could also be implementation-based, outside of cellular communication standards.

Referring to the second configuration, a UE can report angle measurements (e.g., DL-AoA, DL-ZoA, UL-AoD, UL-ZoD) to the location server over LPP signaling using the GCS. This configuration may be chosen where the UE is able to determine its absolute orientation relative to the GCS. In this configuration, the location server receives the angle report and executes the positioning algorithm without needing to convert the angle measurements from the UE's LCS to the GCS.

Where the angle reporting entity is a base station, for the first configuration described herein (in which the reporting entity reports angle measurements in its LCS), the base station reports angle measurements (e.g., DL-AoD, DL-ZoD, UL-AoA, UL-AoZ) to the location server over NRPPa or LPPa signaling using the base station's LCS. To convert the base station's LCS to the GCS, the location server can simply look up the orientation of the base station in the base station's BSA and convert the LCS angle measurements to GCS angle measurements and execute the positioning algorithm.

In some cases, however, the orientation of the base station may not be known. In that case, the location server may be able to use AoA/AoD measurements from multiple base stations and "subtract out" or estimate the base station's unknown orientation. More specifically, a base station with unknown orientation can transmit beamformed signals (as described above with reference to FIG. 4) that are received by base stations with known orientation. The receiving base stations, or the location server, can estimate the relative direction and orientation of the antenna array of the transmitting base station based on the AoA of the received transmit beams and the associated signal strengths, similar to the techniques described above with reference to FIG. 4. The location server can then estimate the orientation of the base station with unknown orientation based on the information from the base stations with known orientation. Note that this technique may not be possible for UEs due to the changing beam patterns of UEs.

Referring now to the second configuration described herein (in which the reporting entity reports angle measurements in the GCS), as for the UE, the base station reports angle measurements (e.g., DL-AoD, DL-ZoD, UL-AoA, UL-AoZ) to the location server over NRPPa/LPPa signaling using the GCS. The location server receives the angle report and executes the positioning algorithm without needing to convert the angle measurements from the base station's LCS to the GCS.

Figure 10:
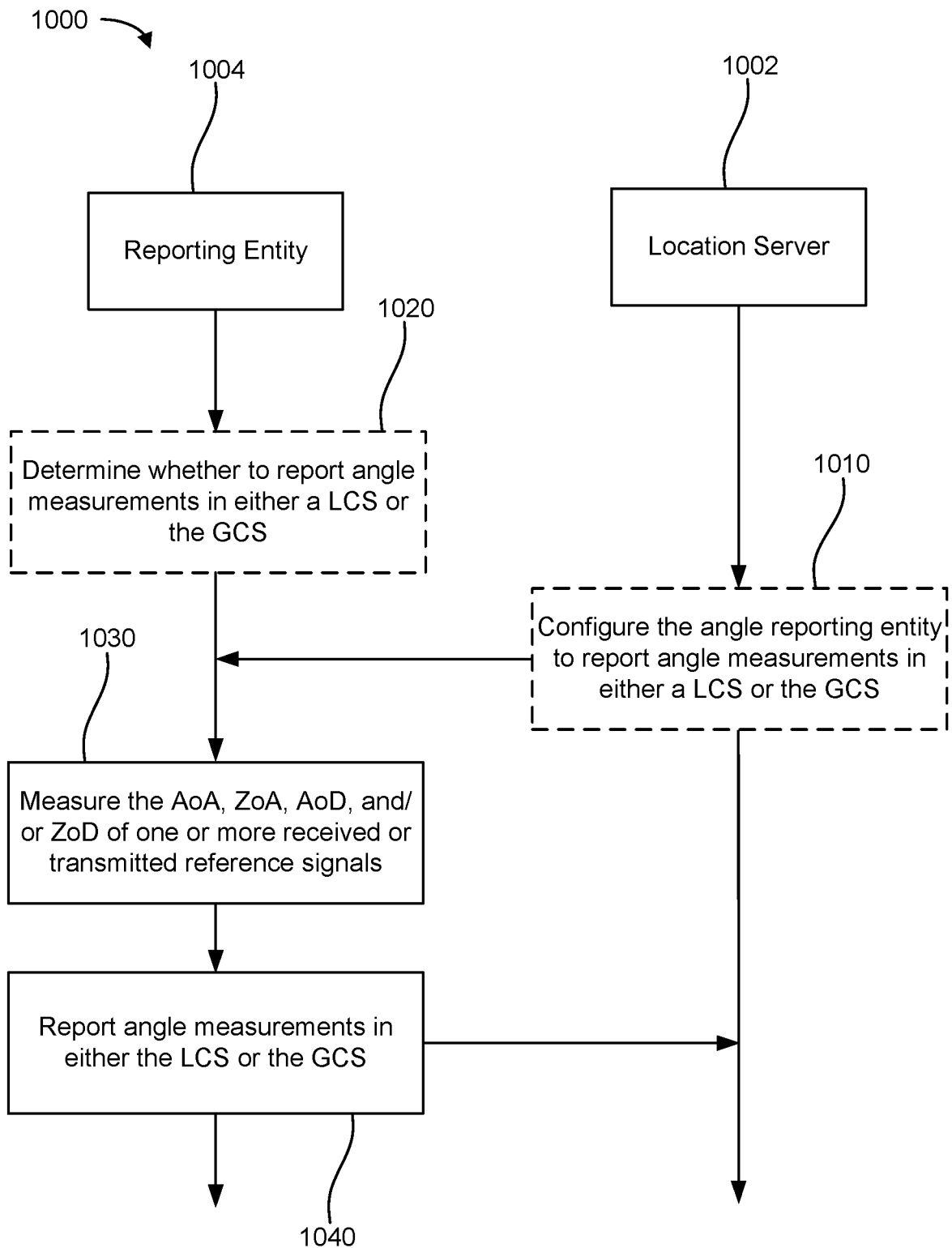
FIG. 10 illustrates an exemplary method 1000 for reporting angle measurements, according to aspects of the disclosure.

The angle reporting entity may be configured/triggered to report angle measurements in either its LCS (the first configuration) or the GCS (the second configuration) in various ways. FIG. 10 illustrates an exemplary method 1000 for reporting angle measurements in either an LCS or a GCS, according to aspects of the disclosure. At 1010, as a first optional operation, the location server 1002 (which may correspond to location server 230, LMF 270, or SLP 272) can configure the angle reporting entity 1004 (any of the base stations or UEs described herein) to report angle measurements in either the reporting entity's LCS or the GCS of the network. In an aspect, the location server 1002 only needs to configure the reporting entity 1004 in this way when an angle-based positioning procedure is being performed. The location server 1002 can send the configuration signal during an LPP session (for a UE) or an NRPPa or LPPa session (for a base station) with the reporting entity 1004.

In an aspect, the location server 1002 may configure the reporting entity 1004 to use the GCS, but the reporting entity 1004 may be unable to determine the angle measurements in the GCS. In that case, the reporting entity 1004 uses its LCS and notifies the location server 1002 that the measurements are in its LCS. This indication can be included with the angle measurement report (at 1040), or it can be a separate signal. For example, the reporting entity 1004 can send the indication to the location server 1002 during the LPP session (for a UE) or the NRPPa/LPPa session (for a base station).

As a second optional operation, at 1020, the angle reporting entity 1004 can choose for itself whether to report the angle measurements in the LCS or the GCS (at 1040). The reporting entity 1004 can then autonomously inform the location server 1002 of whether the angle measurements are in the LCS or the GCS. This indication can be included with the angle measurement report (at 1040), or it can be a separate signal (not shown). For example, the reporting entity 1004 can send the indication to the location server 1002 over the LPP session (for a UE) or the NRPPa/LPPa session (for a base station). Whether the reporting entity 1004 chooses to use its LCS or the GCS may depend on whether it has knowledge of its orientation (e.g., orientation sensors at the UE, or a BSA at the base station). The reporting entity 1004 need only report this parameter when it is performing an angle-based positioning procedure.

Operations 1010 and 1020 are optional because only one need be performed. That is, either the location server 1002 will configure the reporting entity 1004 to report angle measurements in the LCS or GCS (1010), or the reporting entity 1004 determines the coordinate system in which to report measurements (1020).

At 1030, if the reporting entity 1004 is a UE, the reporting entity 1004 measures the DL-AoA, DL-ZoA, UL-AoD, and/or UL-ZoD of one or more reference signals received from a base station or other transmission point. If the reporting entity 1004 is a base station or other transmission point, then at 1030, the reporting entity 1004 measures the DL-AoD, DL-ZoD, UL-AoA, and/or UL-AoZ of one or more reference signals transmitted by a UE. At 1040, the reporting entity 1004 sends a measurement report to the location server 1002 containing the angle measurements. The report may include an indication of whether the angle measurements are in the LCS or GCS, as described above.

Figure 11:
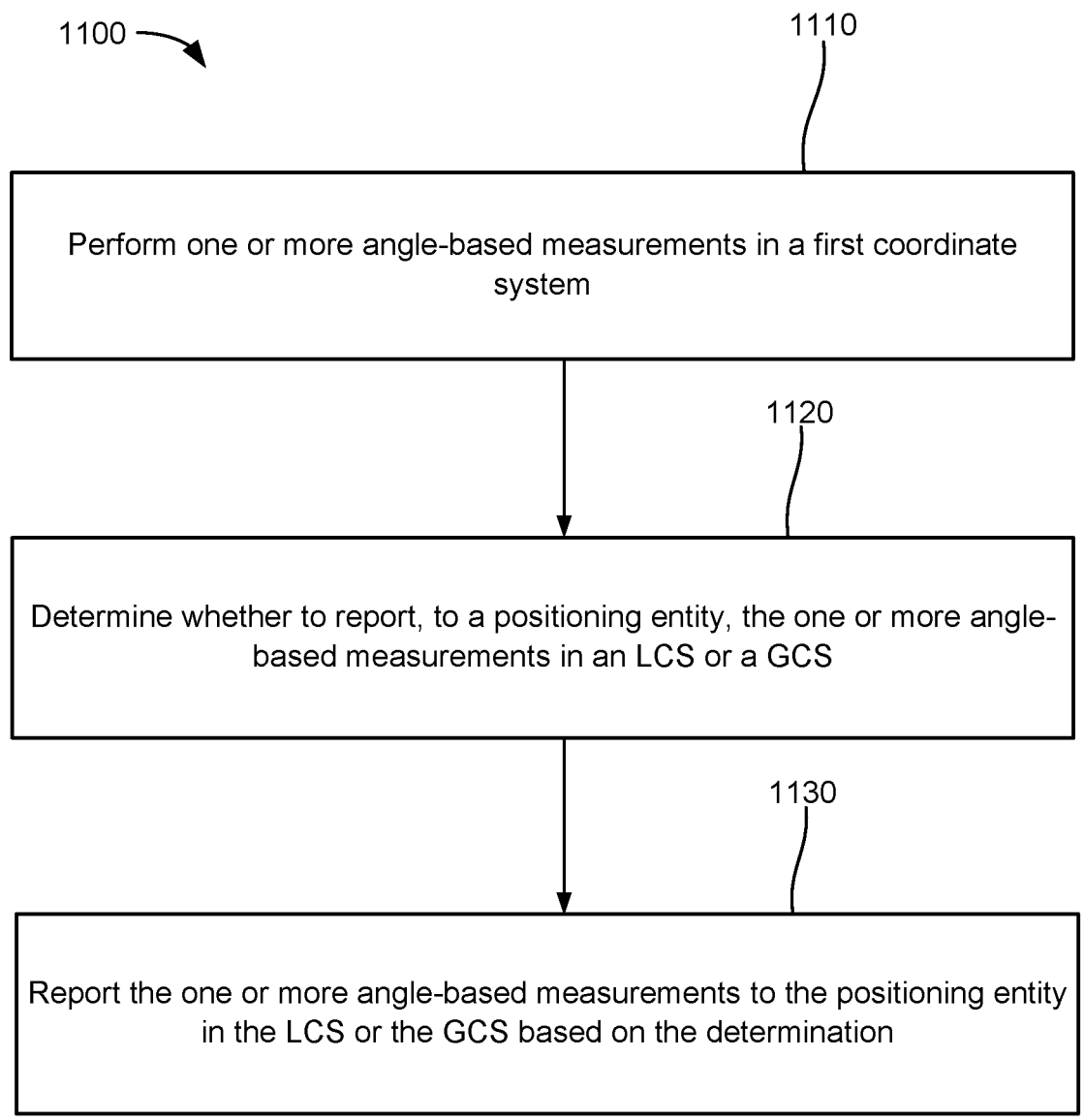
FIGS. 11 and 12 illustrate exemplary methods of wireless communication, according to aspects of the disclosure.

FIG. 11 illustrates an exemplary method 1100 of wireless communication, according to aspects of the disclosure. In an aspect, the method 1100 may be performed by a base station, such as any of the base stations described herein.

At 1110, the base station performs one or more angle-based measurements in a first coordinate system. In an aspect, operation 1110 may be performed by WWAN transceiver 350, processing system 384, memory component 386, and/or angle-based measurement manager 388 of the base station 304, any or all of which may be considered means for performing this operation.

At 1120, the base station determines whether to report, to a positioning entity (e.g., the UE being measured, a serving base station, location server 230, LMF 270, SLP 272), the one or more angle-based measurements in an LCS or a GCS. In an aspect, operation 1120 may be performed by WWAN transceiver 350, processing system 384, memory component 386, and/or angle-based measurement manager 388 of the base station 304, any or all of which may be considered means for performing this operation.

At 1130, the UE reports the one or more angle-based measurements to the positioning entity in the LCS or the GCS based on the determination. In an aspect, operation 1130 may be performed by WWAN transceiver 350, processing system 384, memory component 386, and/or angle-based measurement manager 388 of the base station 304, any or all of which may be considered means for performing this operation.

Figure 12:
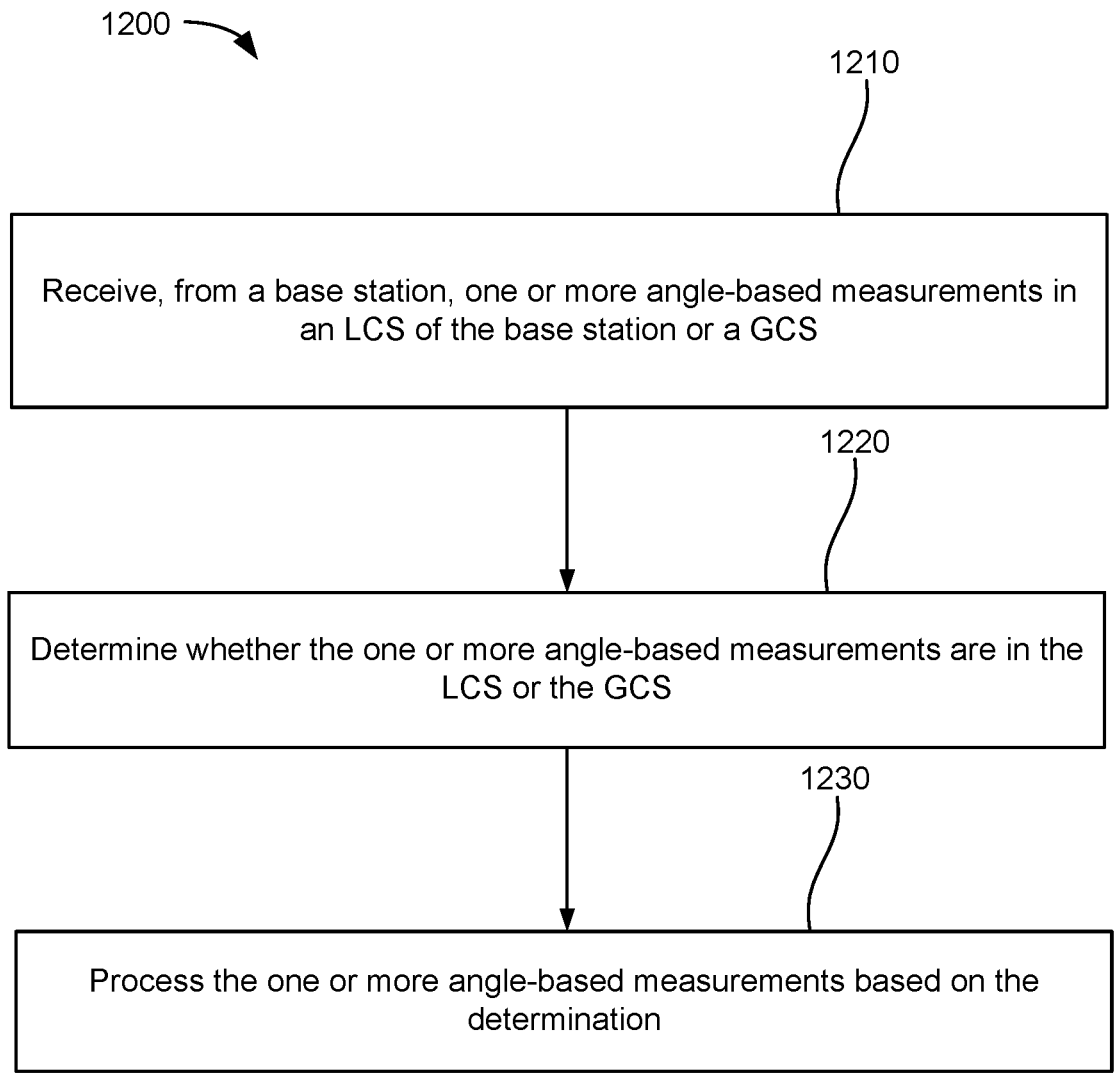

FIG. 12 illustrates an exemplary method 1200 of wireless communication, according to aspects of the disclosure. In an aspect, the method 1200 may be performed by a positioning entity, such as a UE, a serving base station, location server 230, LMF 270, or SLP 272.

At 1210, the positioning entity receives, from a base station, one or more angle-based measurements in an LCS of the base station or a GCS. In an aspect, if the positioning entity is located at a UE, operation 1210 may be performed by WWAN transceiver 310, processing system 332, memory component 340, and/or angle-based measurement manager 342 of the UE 302, any or all of which may be considered means for performing this operation. Where the positioning entity is located at a base station, operation 1210 may be performed by WWAN transceiver 350, processing system 384, memory 385, and/or angle-based measurement manager 388 of the base station 304, any or all of which may be considered means for performing this operation. Where the positioning entity is located at a location server, operation 1210 may be performed by network interface(s) 390, processing system 394, memory 396, and/or angle-based measurement manager 398 of the network entity 306, any or all of which may be considered means for performing this operation.

At 1220, the positioning entity determines whether the one or more angle-based measurements are in the LCS or the GCS. The positioning entity may have configured the base station to report the one or more angle-based measurements in the LCS or the GCS, and/or the positioning entity may have received an indication that the one or more angle-based measurements are in the LCS of the GCS, as described above with reference to FIG. 10. In an aspect, if the positioning entity is located at a UE, operation 1220 may be performed by WWAN transceiver 310, processing system 332, memory component 340, and/or angle-based measurement manager 342 of the UE 302, any or all of which may be considered means for performing this operation. Where the positioning entity is located at a base station, operation 1220 may be performed by WWAN transceiver 350, processing system 384, memory 385, and/or angle-based measurement manager 388 of the base station 304, any or all of which may be considered means for performing this operation. Where the positioning entity is located at a location server, operation 1220 may be performed by network interface(s) 390, processing system 394, memory 396, and/or angle-based measurement manager 398 of the network entity 306, any or all of which may be considered means for performing this operation.

At 1230, the positioning entity processes the one or more angle-based measurements based on the determination. In an aspect, if the positioning entity is located at a UE, operation 1230 may be performed by WWAN transceiver 310, processing system 332, memory component 340, and/or angle-based measurement manager 342 of the UE 302, any or all of which may be considered means for performing this operation. Where the positioning entity is located at a base station, operation 1230 may be performed by WWAN transceiver 350, processing system 384, memory 385, and/or angle-based measurement manager 388 of the base station 304, any or all of which may be considered means for performing this operation. Where the positioning entity is located at a location server, operation 1230 may be performed by network interface(s) 390, processing system 394, memory 396, and/or angle-based measurement manager 398 of the network entity 306, any or all of which may be considered means for performing this operation.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a DSP, an ASIC, an FPGA, or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a base station, comprising:
   performing one or more angle-based measurements in a first coordinate system, wherein the one or more angle-based measurements are one or more uplink angle-of-arrival (AoA) measurements;
   determining whether to report, to a positioning entity, the one or more angle-based measurements in a local coordinate system (LCS) or a global coordinate system (GCS); and
   reporting the one or more angle-based measurements to the positioning entity in the LCS or the GCS based on the determination.

2. The method of claim 1, wherein the one or more AoA measurements comprise one or more uplink azimuth AoA measurements, one or more uplink zenith angle of arrival (ZoA) measurements, or any combination thereof.

3. The method of claim 1, wherein:
the one or more angle-based measurements are of one or more uplink reference signals received at the base station from a user equipment (UE), and
the one or more angle-based measurements represent a direction from the base station to the UE.

4. The method of claim 3, further comprising:
receiving, from the positioning entity, an estimate of a location of the UE based on the one or more angle-based measurements and a distance between the base station and the UE; and
transmitting, to the UE, the estimate of the location of the UE.

5. The method of claim 4, wherein the distance between the base station and the UE is estimated based on a round-trip-time procedure or a timing advance associated with the UE.

6. The method of claim 1, wherein the determining comprises determining to report the one or more angle-based measurements in the LCS.

7. The method of claim 6, further comprising:
reporting, to the positioning entity, assistance data related to the one or more angle-based measurements.

8. The method of claim 7, wherein the assistance data comprises an indication of which of the one or more angle-based measurements were taken while an orientation of the base station was unchanged.

9. The method of claim 7, wherein the assistance data comprises a timestamp associated with each of the one or more angle-based measurements and a time at which an orientation of the base station changed.

10. The method of claim 7, wherein the assistance data comprises an indication that an orientation of the base station changed while the base station was performing the one or more angle-based measurements.

11. The method of claim 7, wherein the assistance data comprises an indication that an orientation of the base station changed while the base station was performing the one or more angle-based measurements and an amount of the change in the orientation.

12. The method of claim 1, wherein the determining comprises determining to report the one or more angle-based measurements in the GCS.

13. The method of claim 12, further comprising:
converting the one or more angle-based measurements from the LCS to the GCS.

14. The method of claim 13, wherein the converting is based on information related to an orientation of the base station.

15. The method of claim 14, wherein the orientation of the base station is expressed as a set of bearing, downtilt, and antenna slant angles (a, B, y) in the LCS with respect to the GCS.

16. The method of claim 1, wherein the base station determines to report the one or more angle-based measurements in the LCS or the GCS based on an ability of the base station to determine an orientation of the base station.

17. The method of claim 16, wherein, based on the base station being able to determine the orientation of the base station, the base station determines to report the one or more angle-based measurements in the GCS, the method further comprising:
reporting, to the positioning entity, an indication that the one or more angle-based measurements are being reported in the GCS.

18. The method of claim 16, wherein, based on the base station not being able to determine the orientation of the base station, the base station determines to report the one or more angle-based measurements in the LCS, the method further comprising:
reporting, to the positioning entity, an indication that the one or more angle-based measurements are being reported in the LCS.

19. The method of claim 1, wherein the determining comprises:
receiving, from the positioning entity, an indication to report the one or more angle-based measurements in the LCS or the GCS.

20. The method of claim 1, wherein the first coordinate system is the LCS.

* * * * *